United States Patent
Bowers et al.

(10) Patent No.: US 12,190,859 B2
(45) Date of Patent: Jan. 7, 2025

(54) SYNTHESIZED SPEECH AUDIO DATA GENERATED ON BEHALF OF HUMAN PARTICIPANT IN CONVERSATION

(71) Applicant: GOOGLE LLC, Mountain View, CA (US)

(72) Inventors: Mark Bowers, Brooklyn, CA (US); Brian F. Allen, San Francisco, CA (US); Nida Zada, San Jose, CA (US); Julie Anne Seguin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 95 days.

(21) Appl. No.: 17/792,012

(22) PCT Filed: Feb. 10, 2020

(86) PCT No.: PCT/US2020/017562
§ 371 (c)(1),
(2) Date: Jul. 11, 2022

(87) PCT Pub. No.: WO2021/162675
PCT Pub. Date: Aug. 19, 2021

(65) Prior Publication Data
US 2023/0046658 A1    Feb. 16, 2023

(51) Int. Cl.
*G10L 13/10*      (2013.01)
*G10L 13/04*      (2013.01)
*G06V 40/10*     (2022.01)

(52) U.S. Cl.
CPC .............. *G10L 13/04* (2013.01); *G10L 13/10* (2013.01); *G06V 40/10* (2022.01)

(58) Field of Classification Search
CPC ... G10L 13/00; G10L 13/02; G10L 2013/021; G10L 13/027; G10L 13/033;
(Continued)

(56) References Cited

U.S. PATENT DOCUMENTS 8,352,270 B2   1/2013 Wang et al.
9,384,737 B2   7/2016 Lamb et al.
(Continued)

FOREIGN PATENT DOCUMENTS

CN    108962217    12/2018
CN    109616122     4/2019
(Continued)

OTHER PUBLICATIONS

European Patent Office; Invitation to Pay Additional Fees; Ser. No. PCT/US2020/017562; 11 pages; dated Oct. 15, 2020.
(Continued)

*Primary Examiner* — Huyen X Vo
(74) *Attorney, Agent, or Firm* — Gray Ice Higdon

(57) ABSTRACT

Generating synthesized speech audio data on behalf of a given user in a conversation. The synthesized speech audio data includes synthesized speech that incorporates textual segment(s). The textual segment(s) can include recognized text that results from processing spoken input, of the given user, using a speech recognition model and/or can include a selection of a rendered suggestion that conveys the textual segment(s). Some implementations dynamically determine one or more prosodic properties for use in speech synthesis of the textual segment, and generate the synthesized speech with the one or more determined prosodic properties. The prosodic properties can be determined based on the textual segment(s) used in speech synthesis, textual segment(s) corresponding to recent spoken input of additional participant(s), attribute(s) of relationship(s) between the given user and additional participant(s) in the conversation, and/or feature(s) of a current location for the conversation.

19 Claims, 11 Drawing Sheets

(58) Field of Classification Search
CPC ... G10L 13/0335; G10L 13/04; G10L 13/047; G10L 13/06; G10L 13/07; G10L 13/08; G10L 2013/083; G10L 13/086; G10L 13/10; G10L 2013/105; G10L 15/00; G10L 17/00; G10L 5/005
See application file for complete search history.

(56) References Cited

U.S. PATENT DOCUMENTS

| | | | |
|---|---|---|---|
| 9,992,641 | B2 | 6/2018 | Lee |
| 11,763,821 | B1* | 9/2023 | McNair ............... G10L 15/30 704/270.1 |
| 2010/0299147 | A1 | 11/2010 | Stallard |
| 2014/0019135 | A1 | 1/2014 | Talwar et al. |
| 2015/0095034 | A1 | 4/2015 | Acker et al. |
| 2016/0049144 | A1* | 2/2016 | Conkie ............... G10L 13/08 704/234 |
| 2017/0116883 | A1 | 4/2017 | Wohlert |
| 2017/0243582 | A1 | 8/2017 | Menezes |
| 2019/0005021 | A1 | 1/2019 | Miller et al. |
| 2019/0007623 | A1* | 1/2019 | Wang ................... H04N 7/147 |
| 2020/0051545 | A1* | 2/2020 | Iwase ................. G10L 25/84 |
| 2021/0082438 | A1* | 3/2021 | Zhao .................. G10L 17/02 |
| 2022/0165293 | A1* | 5/2022 | Nagasaka ............. G10L 15/26 |

FOREIGN PATENT DOCUMENTS

| | | |
|---|---|---|
| EP | 3540727 | 9/2019 |
| KR | 20160141595 | 12/2016 |
| WO | 2021162675 | 8/2021 |

OTHER PUBLICATIONS

European Patent Office; International Search Report and Written Opinion of PCT Ser. No. PCT/US2020/017562; 15 pages; dated Dec. 7, 2020.

Kisner, J.; "How a new technology is changing the lives of people who cannot speak"; retrieved from the internet: https://www.theguardian.com/news/2018/jan/23/voice-replacement-technology-adaptive-alternative-communication-vocalid; 16 pages; dated Jan. 23, 2018.

The Korean Intellectual Property Office; Notice of Office Action issued in Application No. 10-2022-7031429; 14 pages; dated Sep. 26, 2023.

European Patent Office; Intention to Grant issued in Application No. 20709976.3; 102 pages; dated May 8, 2024.

European Patent Office; Communication issued in Application No. 24198013.5; 6 pages; dated Oct. 11, 2024.

The Korean Intellectual Property Office; Decision of Rejection issued in Application No. 10-2022-7031429; 8 pages; dated Jun. 21, 2024.

* cited by examiner

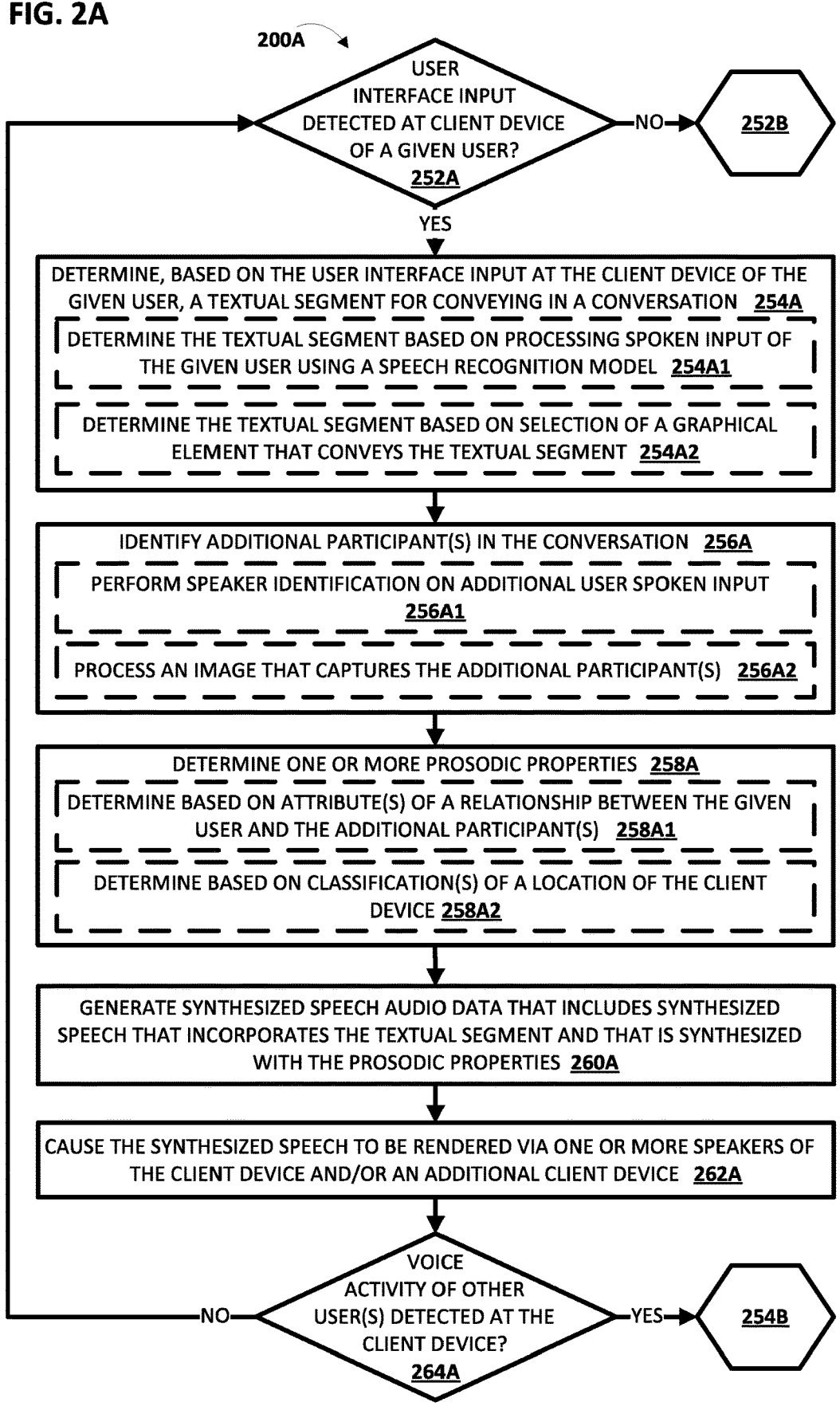

SYNTHESIZED SPEECH AUDIO DATA GENERATED ON BEHALF OF HUMAN PARTICIPANT IN CONVERSATION

BACKGROUND

Voice-based user interfaces are increasingly being used in the control of computers and other electronic devices. Many voice-based user interfaces perform speech recognition (e.g., using a speech-to-text model) on spoken input to generate corresponding text, perform a semantic analysis of the text in an attempt to determine the meaning of the spoken input, and undertake one or more actions based on the determined meaning. The action(s) undertaken can include controlling smart device(s), controlling a client device, and/or determining and/or providing an automated response. In some situations, the action(s) include generating synthesized speech that conveys the automated response and/or that indicates that the smart device(s) and/or client device have been controlled.

SUMMARY

Implementations disclosed herein relate to generating synthesized speech audio data on behalf of a given user (i.e., a human participant) in a conversation, such as a conversation that involves the given user and additional participant(s) (i.e., other human participant(s)). For example, the conversation can be between the given user and additional participant(s) that are in an environment with the given user. Further, the synthesized speech audio data can be audibly rendered via hardware speaker(s) of client device(s) in the environment, thereby being audibly perceptible to the additional participant(s). The synthesized speech audio data includes synthesized speech that incorporates textual segment(s), where the textual segment(s) are determined based on user interface input(s) of the given user.

In some implementations, the user interface input(s) on which textual segment(s) are determined can include given user spoken input (or spoken input, of the given user), and the textual segment(s) can be determined based on it being recognized text that results from processing the spoken input using a speech recognition model. In some of those implementations, the spoken input can be processed, using the speech recognition model, to generate (given user) recognized text that accurately reflects the spoken input. While recognizable using the speech recognition model, all or portions of the spoken input can be unascertainable by one or more of the additional human participant(s) due to certain characteristic(s) of the spoken input itself (e.g., due to permanent or temporary speech impairment of the given user) and/or due to adverse environmental condition(s) (e.g., excessive background noise, other spoken input(s) overlapping with the spoken input, etc.). On the other hand, the synthesized speech, that incorporates the textual segment(s), can be generated based on the accurately recognized textual segment(s) and will not embody the certain characteristic(s) of the spoken input and/or the adverse environmental condition(s) that prevented ascertainment of the spoken input. Accordingly, when rendered, the synthesized speech will be ascertainable by the additional participant(s). In these and other manners, speech recognition and speech synthesis can be used, in combination, to facilitate efficient conversation between a given user and additional participant(s). This can be of particular benefit for users with speech impairment(s).

In some of the implementations where the user interface input(s) include a spoken input, the given user has speech impairment(s) and the speech recognition model can optionally be a tailored speech recognition model that has been trained for recognizing speech of users having those speech impairment(s). For example, the tailored speech recognition model can be trained based on training instances that each include corresponding training instance input that characterizes an impaired spoken input (e.g., Mel-Frequency Cepstral Coefficient(s) or other feature(s) of corresponding audio data) and training instance output that characterizes ground truth textual segment(s) that correspond to the impaired spoken input. For example, each impaired spoken input can be impaired as a result of articulation disorder(s), fluency disorder(s), and/or voice disorder(s). In these and other manners, the speech recognition model can be used to generate a recognized textual segment for an impaired spoken input. Further, synthesized speech audio data can be generated that includes synthesized speech that incorporates the recognized textual segment(s), and the synthesized speech audio data can be audibly rendered so that it is audibly perceptible to additional participant(s). Thus, those and other implementations disclosed herein can facilitate conversation for speech-impaired users.

In some additional or alternative implementations, the user interface input(s) on which textual segment(s) are based can include a selection (e.g., a single "tap" or other single selection) of a rendered suggestion that conveys the textual segment(s). For example, a suggestion that conveys a textual segment can be rendered, at a client device of the given user, based on determining that the textual segment is a candidate response to recent spoken input of an additional participant. For instance, speech recognition can be performed on the recent spoken input to generate a corresponding textual segment, and the textual segment can be determined to be a candidate response to the generated corresponding textual segment. Determining that the textual segment is the candidate response can be based on at least one of the attributes of the relationship between the given user and the additional participant. In some examples, this can comprise generating a superset of initial candidate responses (or a plurality of possible candidate responses) based on the additional participant textual segment (the textual segment recognized from the spoken input of the additional participant) and selecting, from the superset of initial candidate responses, the textual segment as the candidate response based on the attributes of the relationship. The suggestion can be rendered, as a graphical element at the client device, optionally along with other suggestion(s) that each convey a corresponding alternative textual segment also determined to be a candidate response to the recent spoken input of the additional participant (i.e. alongside other candidate responses of the superset). In these and other manners, the given user can provide efficient user interface input(s) (e.g., a single selection) directed to textual segment(s) to cause corresponding synthesized speech to be audibly rendered to additional participants. This can enable speech recognition processing of spoken input of the given user to be bypassed, thereby enabling an audible synthetic response of the given user to be provided more quickly, and thereby shortening the overall duration of the conversation and overall duration that client device resources are utilized in facilitating the conversation. Conversation for speech-impaired users may therefore be improved without significant increases in computational and/or network resources.

In various implementations, a candidate response that is determined based on generated textual segment(s) corresponding to the recent spoken input of additional participant(s) can be determined and/or conveyed (or provided) in a rendered suggestion at a given user's client device responsive to identifying that the spoken input was provided by an additional participant that is not the given user. Put another way, determining the candidate response and/or rendering the candidate response can occur responsive to detecting spoken input and identifying that the spoken input is from an additional participant that is in addition to the given user (and optionally that the additional participant is a recognized user known to the client device). In some versions of those implementations, speaker identification can be performed or utilized to differentiate between spoken inputs of the given user and spoken inputs of additional participant(s) engaged in a conversation with the given user (and optionally to differentiate amongst additional participants). For example, a detected spoken input can be processed, using a speaker identification model, to generate a corresponding speaker embedding (or a spoken input embedding, i.e. an embedding of the spoken input). That speaker embedding can be compared to a pre-stored (speaker) embedding for the given user and/or for pre-stored (speaker) embedding(s) for additional user(s) to determine whether the spoken input is provided by the given user or an additional user. In some additional or alternative versions, facial recognition techniques can be utilized, optionally in combination with mouth movement detection techniques, to differentiate between spoken inputs of the given user and spoken inputs of additional participant(s) engaged in a conversation with the given user.

When determined to be of the given user, the corresponding recognized text can be used in generating and rendering corresponding synthesized audio data. When determined to be of an additional participant, the corresponding recognized text can be used in determining corresponding candidate response(s) and rendering corresponding suggestion(s) that convey the candidate response(s). Optionally, the corresponding candidate response(s) can be determined and/or selected for rendering based on textual segment(s) used in generating synthesized speech that is on behalf of the given user, in past conversations that also included the additional participant. For example, a candidate response can be selected for rendering (e.g., in a corresponding suggestion) based on determining that the candidate response matches (soft or exact) a textual segment previously incorporated in synthesized speech, on behalf of the given user, during a conversation in which the additional participant was involved. Optionally, when the given user is a speech-impaired user and the tailored speech recognition model is used to process spoken inputs from the given user, the speech recognition of the recent spoken input from the additional participant(s) can be performed using an additional speech recognition model that is not tailored for speech recognition of impaired speech.

Some implementations disclosed herein relate to dynamically determining one or more prosodic properties for use in speech synthesis of a textual segment for a given user, and generating the synthesized speech with the one or more determined prosodic properties. Prosodic properties can include, for example, one or more properties of syllables and larger units of speech, including linguistic functions such as intonation, tone, stress, rhythm, tempo, and pause. One or more prosodic properties of synthesized speech for a textual segment can, in combination, reflect, for example: emotional state; form (e.g., statement, question, or command); irony; sarcasm; and/or emphasis. Information may thus be conveyed in the prosodic properties of normal speech, which information can be lacking in approaches with use voice synthesis; this lack of prosodic properties in synthetic speech can lead to frustration and/or isolation for speech-impaired users. As one non-limiting example, utilization of a first set of prosodic properties can result in synthesized speech that is more formal in tone and slower tempo, whereas utilization of a second set of prosodic properties can result in synthesized speech that is less formal in tone and faster in tempo. Accordingly, which prosodic properties are utilized for speech synthesis will affect various features of the synthesized speech itself, but adjusting prosodic properties, standing alone, will not change the underlying "voice" of the synthesized speech. Put another way, adjusting the prosodic properties of synthesized speech that mimics the voice of Famous Actor 1 (e.g., by applying, to a speech synthesis model, a voice embedding for Famous Actor 1; or training a speech synthesis model solely for Famous Actor 1) will still result in synthesized speech that sounds like Famous Actor 1, but it will just include adjusted prosodic properties.

Various techniques can be used to generate synthesized speech with determined prosodic properties. As one example, post-processing of initially generated synthesized speech audio data can be performed to incorporate one or more of the prosodic properties. For instance, frequency, duration, intensity, and/or spectral characteristics of the initially generated audio data can be adjusted in a certain manner to achieve certain prosodic properties, or adjusted in an alternate manner to achieve certain alternate prosodic properties. As another example, an indication of the prosodic properties can be processed, using the speech synthesis model, to generate initial synthesized speech audio data that incorporates the indicated prosodic properties. Put another way, the speech synthesis model can be trained to process, along with phoneme(s) of a textual segment and optionally a voice embedding, indication(s) of prosodic properties and generate synthesized speech audio data that are dependent on the indicated prosodic properties that are processed. Voice synthesis may therefore be improved, which can be of particular benefit for users with speech-impairment.

In implementations where one or more prosodic properties are dynamically determined, which prosodic properties are used for a textual segment in a conversation can be based on, for example, the textual segment(s) itself and/or generated textual segment(s) corresponding to recent spoken input of additional participant(s), attribute(s) of relationship(s) between the given user and additional participant(s) in the conversation, and/or classification(s) or other feature(s) of a current location for the conversation.

As one example, assume a conversation between a given user and a single additional participant. The additional participant can be identified using one or more techniques such as speaker identification (e.g., based on processing spoken input of the additional participant to identify a speaker) and/or facial identification (e.g., based on processing image(s) and/or other vision data of the additional participant). For example, the additional participant can be identified as an "unknown" user based on speaker identification indicating that a generated speaker embedding for the spoken input fails to sufficiently match (e.g., fails to reach or satisfy a distance threshold relative to) any stored speaker embedding and/or facial identification indicating that a generated visual embedding for captured image(s) fails to sufficiently match any stored visual embedding. When the additional participant is unknown, the "unknown" attribute of the relationship between the given user and the additional participant can be used to select a first set of prosodic properties (e.g., those explicitly mapped to relationships having an "unknown" attribute). For example, the first set of prosodic properties can result in synthesized speech that is formal in tone and has a relatively slow tempo.

Also, for example, the additional participant can be identified as a particular known user based on speaker identification indicating that a generated speaker embedding for the spoken input sufficiently matches a stored speaker embedding for the additional participant (e.g., stored locally on client device(s) with explicit permission from the additional user). The other attribute(s) can include, for example, a quantity of interactions (e.g., conversational interactions) between the given user and the additional participant, a frequency of interactions between the given user and the additional participant, and/or semantic indication(s) of the relationship between the given user and the additional participant (e.g., semantic indication(s) such as boss, friend, close friend, co-worker, family member, and/or other semantic indication(s)). Using prosodic properties which are determined based on such relationships can provide a user with speech impairment the ability to convey the range of emotions and nuances possible with normal speech, as well as the ability to adjust the prosodic properties depending on the closeness of any relationship; quality of communication may therefore be improved.

Different groupings of attribute(s) can be mapped to different groupings of one or more prosodic properties. For instance, a boss attribute can be mapped to a second set of prosodic properties that can result in synthesized speech that is more formal in tone and that avoids sarcasm. Also, for instance, a close friend attribute and/or a frequent interaction attribute can be mapped to a third set of prosodic properties that can result in synthesized speech that is casual in tone and has a relatively fast tempo. The faster tempo can enable the synthesized speech to be rendered more quickly, and a resulting conversation to be concluded more quickly. Although the faster tempo can potentially make the synthesized speech more difficult to understand, utilizing the faster tempo responsive to determining the close friend and/or frequent interaction attribute(s) can mitigate this risk in view of the close friend and/or frequent interaction attribute(s) indicating familiarity of the synthesized speech of the given user. In these and other manners, prosodic attribute(s) that lead to quicker rendering of synthesized speech (and shorter duration of utilization of associated computational resources) can be selectively utilized, balancing such efficiencies with relationship attribute(s) that indicate risk of needing to repeat the rendering if the synthesized speech is not understood.

More generally, dynamically determining prosodic properties in dependence on attribute(s) of relationship(s), feature(s) of a current location for a conversation, the textual segment to be synthesized (and/or recent textual segments), and/or other factor(s) can result in synthesized speech that incorporates determined prosodic properties that are determined in view of the factor(s). As a result, the synthesized speech, when rendered, can be more readily comprehensible by the additional participant(s) in the conversation as it is particularly adapted in view of the factor(s). This can mitigate occurrences of lack of comprehension of the synthesized speech by additional participant(s), which would result in the synthesized speech (or alternate synthesized speech for a rephrasing of the textual segment) again being rendered. Accordingly, utilization of resource(s), in again rendering synthesized speech or alternate synthesized speech, can be mitigated. Further, the overall duration of a conversation can be shortened through mitigating occurrences of additional rendering of synthesized speech, thereby conserving various computational resources that would otherwise be utilized in facilitating a more prolonged conversation.

As mentioned above, prosodic properties can additionally and/or alternatively be dynamically determined based on classification(s) or other feature(s) of a current location for the conversation. For example, a first set of prosodic properties can be determined and utilized at a location having a home classification (i.e., a home classification relative to the given user—the given user's home), a second set of prosodic properties can be determined and utilized at a location having a work classification (i.e., a work classification relative to the given user—the given user's place of work), a third set of prosodic properties can be determined and utilized at a location having a coffee shop classification (common to all users), and a fourth set of prosodic properties can be determined and utilized at a location having a bar classification (common to all users). Such location based approaches can facilitate the improved participation of speech-impaired users in every-day life by reducing or mitigating communication issues caused by the speech impairment.

Regardless of the techniques utilized to determine the one or more prosodic properties, in some implementations, the determined set of prosodic properties can, in response to receiving spoken input, be automatically determined, the synthesized speech audio data that includes synthesized speech that is synthesized with the determined prosodic properties and that includes textual segment(s) included in the received spoken input can be automatically synthesized, and the synthesized speech can be audibly rendered at the client device responsive to receiving the spoken input from the given user. In some other implementations, the determined set of prosodic properties can, in response to receiving spoken input, be automatically determined, the synthesized speech audio data that includes synthesized speech that is synthesized with the determined prosodic properties and that includes textual segment(s) included in the received spoken input can be automatically generated, but the synthesized speech until can be withheld from audible rendering until a timeout period ends (e.g., three seconds, five seconds, and so on). During this timeout period, the given user can manually adjust the determined set of prosodic properties. In yet other implementations, the determined set of prosodic properties can, in response to receiving spoken input, be automatically determined, the synthesized speech audio data that includes synthesized speech that is synthesized with the determined prosodic properties and that includes textual segment(s) included in the received spoken input can be automatically generated, but the synthesized speech until can be withheld from audible rendering until further user interface input, from the given user is detected at the client device, affirms that the synthesized speech should be audibly rendered with the determined set of prosodic properties. Not only does this allow the given user to manually adjust the determined prosodic properties, but the given user can also modify a transcription of the determined textual segment(s) included in the synthesized speech prior to rendering of the synthesized speech.

Moreover, in various implementations, additional user interface input(s) can include additional user spoken input of additional participant(s) engaged in a conversation with a given user (i.e. the additional user interface input can include spoken input from additional participant(s) in a conversation). Further, corresponding textual segment(s) can be determined based on it being recognized text that results from processing the additional user spoken input using a speech recognition model. In some of those implementations, the additional user spoken input can be processed, using the speech recognition model, to the corresponding textual segment(s), and the corresponding textual segment(s) can be visually rendered as a transcription on a user interface at a client device of the given user. Moreover, in some further versions of those implementations, a graphical element that identifies a given one of the additional participant(s) that spoke the additional user spoken input can be visually rendered along with the transcription of the corresponding segment(s). The graphical element can be selectable, and, upon receiving user interface input(s) from the given user directed to the graphical element, the client device can cause a prosodic properties user interface to be visually rendered at the client device. A selectable graphical element may be beneficial for users with speech impairment, since selection of such an element mitigates any risk of misunderstanding further speech input to select a transcription.

In various implementations, the prosodic properties user interface enables the given user of the client device to modify one or more determined prosodic properties for the given one of the additional participant(s) identified by the graphical element. In some of those implementations, the given user of the client device can interact with the prosodic properties user interface to make a "global" modification to the one or more determined prosodic properties. For example, the prosodic properties user interface can include a scale that indicates how "formal" or "casual" synthesized speech will be that is synthesized with the one or more determined prosodic properties, and the given user can interact with an indicator on the scale to modify the one or more determined prosodic properties to reflect more formal synthesized speech or more casual synthesized speech. In some of those implementations, the given user of the client device can interact with the prosodic properties user interface to make an "individual" modification to one or more of the determined prosodic properties. For example, the prosodic properties user interface can include a listing of the one or more determined prosodic properties and a corresponding field for each of the one or more determined prosodic properties, and the user can interact with the corresponding field to modify a given one of the determined prosodic properties (e.g., selecting "moderate" or "slow" temp from a drop down box that is the corresponding field, specifying 50% or 30% tempo in the corresponding field, enabling or disabling a given one of the determined prosodic properties, and/or other fields for modifying the given one of the prosodic properties). Accordingly, the one or more determined prosodic properties, for a given one of the additional participant(s), can also be manually adjusted by the given user of the client device based on interaction with the prosodic properties user interface.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIGS. 2A and 2B depict flowcharts illustrating example methods of generating synthesized speech that is synthesized with one or more prosodic properties, in accordance with various implementations.

DETAILED DESCRIPTION

Figure 1:
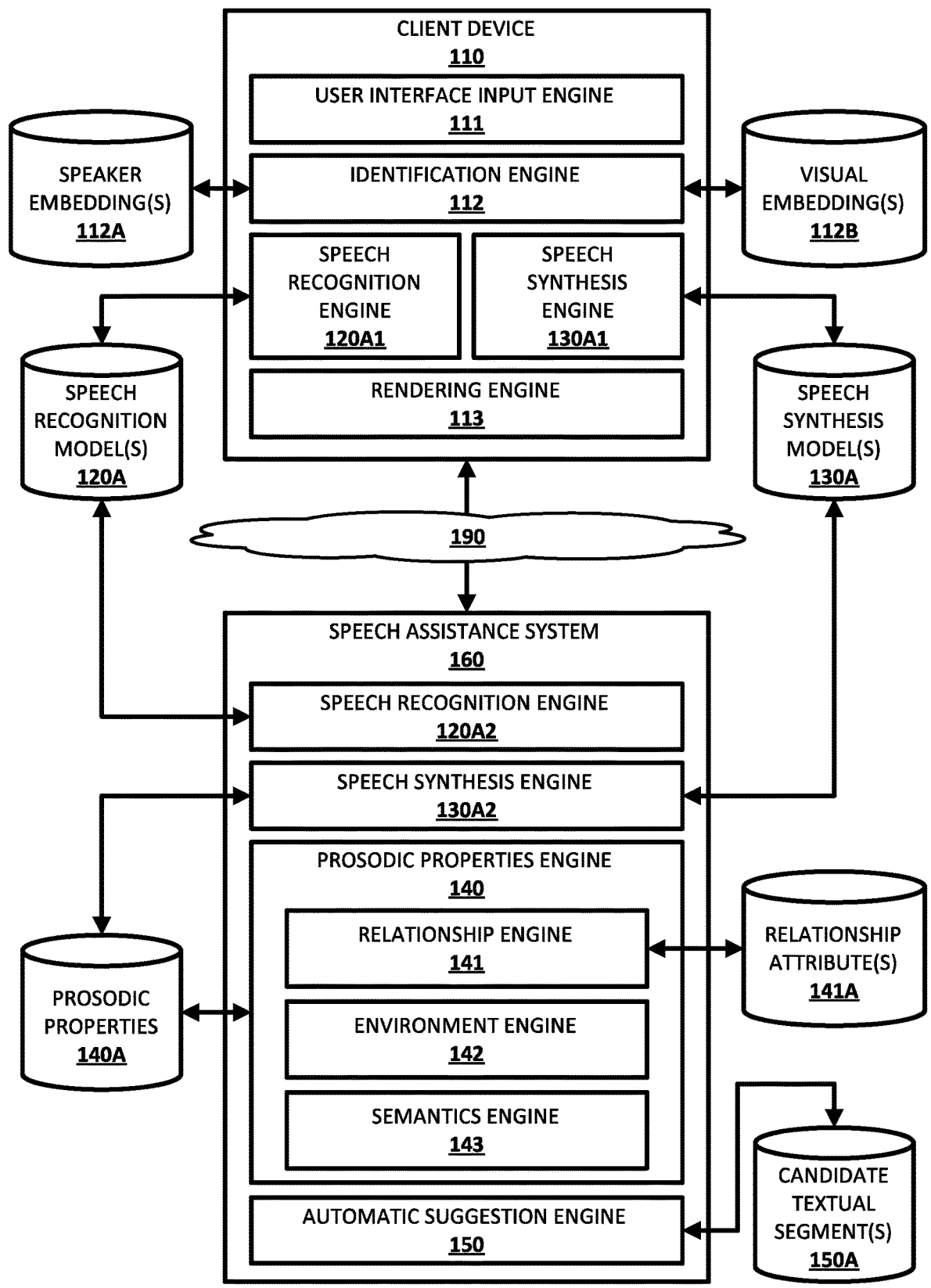
FIG. 1 depicts a block diagram of an example environment that demonstrates various aspects of the present disclosure, and in which implementations disclosed herein may be implemented.

FIG. 1 illustrates a block diagram of an example environment that demonstrates various aspects of the present disclosure. A client device 110 is illustrated in FIG. 1, and includes, in various implementations, a user interface input engine 111, an identification engine 112, a speech recognition engine 120A1, a speech synthesis engine 130A1, and a rendering engine 113.

The user interface input engine 111 can detect user interface input at the client device 110. The user interface input detected at the client device 110 can include spoken input detected via one or more microphones of the client device 110, and/or touch input detected via a user interface of the client device 110. As described herein, the client device 110 can process the detected user interface input to determine a textual segment, corresponding to the detected user interface input, that is to be conveyed in a conversation. For example, the user interface input engine 111 can detect spoken input of a given user of the client device 110 and/or spoken input of additional participant(s) engaged in a conversation with the given user of the client device 110 (i.e. can detect additional participant spoken input). The client device 110 can determine, using one or more speech recognition model(s) 120A, the textual segment corresponding to the spoken input of the given user and/or the additional participant(s) (i.e. can determine an additional participant textual segment). As another example, the user interface input engine 111 can detect selection of a candidate textual segment (e.g., determined using automatic suggestion engine 150 of FIG. 1) to be incorporated in synthesized speech (e.g., generated using speech synthesis model(s) 130A of FIG. 1).

In some implementations, the identification engine 112 can identify a user that spoke the spoken input based on audio data that captures the spoken input (e.g., a given user of the client device 110 or additional participant(s) engaged in a conversation with the given user). The identification engine 112 can process, using a speaker identification model, the audio data that captures the spoken input detected by the user interface input engine 111 to generate an output. Further, the identification engine 112 can generate a speaker embedding based on the generated output (e.g., the output can be the speaker embedding). The generated speaker embedding can be a lower-dimensional (relative to the audio data) representation in a lower-dimensional speaker embedding space, or more particularly, a particular portion of the speaker embedding space. The particular portion of the speaker embedding space can be associated with an identifier of the user associated with the generated speaker embedding mapped to the particular portion of the speaker embedding space. Further, the identification engine 112 can compare the generated speaker embedding to a plurality of speaker embeddings stored locally on the client device 110, in speaker embedding(s) database 112A, to identify a matching speaker embedding in the speaker embedding space. For example, if a distance metric between the generated speaker embedding and a given one of the plurality of speaker embeddings, in the speaker embedding space, satisfies a threshold (e.g., a matching speaker embedding), the user associated with the identifier associated with the matching speaker embedding can be identified as the user that spoke the spoken utterance. For instance, a speaker embedding for an additional participant "Bob" can be mapped to a first portion of the speaker embedding space that is associated with an identifier of "Bob" based on Bob being previously associated with the first portion of the speaker embedding space (e.g., based on user interface input detected at the client device 110), and a speaker embedding for an additional participant "Jane" can be mapped to a second portion of the speaker embedding space that is associated with an identifier of "Jane" based on Jane being previously associated with the second portion of the speaker embedding space (e.g., based on user interface input detected at the client device 110). Thus, subsequently generated speaker embeddings can be mapped to these, or other, portions of the speaker embedding space to identify user(s) in a conversation.

The speaker embedding for the user can be generated based on speaker embedding(s) generated based on processing of one or more instances of audio data that captures spoken input from the user. For example, the speaker embedding can be based on an average (or other combination) of a plurality of different embeddings that are each generated based on processing of a corresponding instance of audio data that captures corresponding spoken input from the user. Once established, the speaker embedding of the user can be stored in the speaker embedding(s) database 112A. In some versions of those implementations, a given user of the client device 110 can interact with an automated assistant, executing at least in part on the client device, to establish a speaker embedding for a given user of the client device 110 (e.g., as described with respect to FIG. 4A), and the established speaker embedding for the given user can be stored in association with the given user in the speaker(s) embedding(s) database 112A. The speaker embedding established for the given user of the client device 110 can be used by the speech synthesis engine(s) 130A1 and/or 130A2 in generating synthesized speech audio data that represents speech of the given user of the client device 110. In some versions of those implementations, upon determining that spoken input does not originate from a given user of the client device 110 (e.g., based on a generated speaker embedding for the spoken input not matching any speaker embedding stored locally in the speaker embedding(s) database 112A), the client device 110 can generate a prompt soliciting authorization, from the additional participant, to store the generated speaker embedding locally on the client device 110 (e.g., as described with respect to FIG. 4D). Further, the generated speaker embedding can be stored in association with the additional participant in the speaker embedding(s) database 112A in response to receiving authorization, from the additional participant, to store the generated speaker embedding. Otherwise the generated speaker embedding can be discarded by the client device 110. By storing the speaker embeddings locally on the client device 110 in the speaker embedding(s) database 112A, the speaker embedding space can be populated with additional participant(s) such that the client device 110 can identify the additional participant(s) when they engage in future conversations with a given user of the client device 110 using corresponding speaker embedding(s) of the additional participant(s).

In some additional and/or alternative implementations, the identification engine 112 can identify user(s) engaged in a conversation based on vision data (e.g., image(s), captured by one or more vision sensors of the client device 110, that includes multiple humans in an environment of the client device 110 (e.g., a given user of the client device 110 and/or additional participant(s) engaged in the conversation with the given user). The environment of the client device, or the surroundings of the client device, may comprise any space or geographical area (whether indoors or outdoors); another participant may be considered to be in the environment if they are close enough to the client device to be audible to the client device and/or to detect audible output from the client device. In some versions of those implementations, the identification engine 112 can utilize one or more facial detection techniques to automatically identify, from the vision data, a given user of the client device 110 and/or at least one additional participant in the conversation. In some other versions of those implementations, the user interface input engine 111 can detect input (e.g., touch or spoken) from the given user of the client device 110 that designates an area of the captured image (and the vision data associated therewith) that includes at least one additional participant in the conversation. The identification engine 112 can process, using a visual identification model, the vision data to generate an output. Further, the identification engine 112 can generate a visual embedding based on the generated output (e.g., the output can be the visual embedding). The generated visual embedding can be a lower-dimensional (relative to the vision data) representation in a lower-dimensional visual embedding space, or more particularly, a particular portion of the speaker embedding space. The particular portion of the embedding space can be associated with an identifier of the user associated with the generated speaker embedding mapped to the particular portion of the speaker embedding space. Further, the identification engine 112 can compare the generated visual embedding to a plurality of visual embeddings stored locally on the client device 110 in visual embedding(s) database 112B to identify a matching visual embedding in the visual embedding space. For example, if a distance metric between the generated visual embedding and a given one of the plurality of visual embeddings, in the visual embedding space, satisfies a threshold (e.g., a matching visual embedding), the user (e.g., a given user of the client device 110 and/or at least one additional participant in the conversation) associated with the identifier associated with the matching visual embedding can be identified as a participant in the conversation. For instance, a visual embedding for an additional participant "Bob" can be mapped to a first portion of the visual embedding space that is associated with an identifier of "Bob" based on Bob being previously associated with the first portion of the visual embedding space (e.g., based on user interface input detected at the client device 110), and visual embedding for an additional participant "Jane" can be mapped to a second portion of the visual embedding space that is associated with an identifier of "Jane" based on Jane being previously associated with the second portion of the visual embedding space (e.g., based on user interface input detected at the client device 110). Thus, subsequently generated visual embeddings can be mapped to these, or other, portions of the visual embedding space to identify user(s) in a conversation.

The visual embedding for the user can be generated based on visual embedding(s) generated based on processing of one or more images captured by the client device 110. For example, the visual embedding can be based on an average (or other combination) of a plurality of different visual embeddings that are each generated based on processing of corresponding vision data that captures at least the user (e.g., a given user of the client device 110 and/or at least one additional participant in the conversation). Once established, the visual embedding of the user can be stored in the visual embedding(s) database 112B. In some implementations, a given user of the client device 110 can interact with an automated assistant, executing at least in part on the client device, to establish a visual embedding for the given user of the client device 110 (e.g., as described with respect to FIG. 4A), and the established visual embedding for the given user can be stored in association with the given user in the visual(s) embedding(s) database 112B. In some implementations, upon determining that an unknown user is engaged in a conversation with a given user of the client device 110 in an environment of the client device 110 (e.g., based on a generated speaker embedding for the spoken input not matching any speaker embedding stored locally in the speaker embedding(s) database 112A and/or based on a generated visual embedding not matching any visual embedding stored locally in the visual embeddings(s) database 112B), the client device 110 can generate a prompt soliciting authorization, from the additional participant associated with the unknown visual embedding, to store the generated visual embedding locally on the client device 110 (e.g., as described with respect to FIG. 4D). Further, the generated visual embedding can be stored in association with the additional participant in the visual embedding(s) database 112B in response to receiving authorization, from the additional participant, to store the generated visual embedding. Otherwise the generated visual embedding can be discarded by the client device 110. By storing the visual embeddings locally on the client device 110 in the visual embedding(s) database 112B, the client device 110 can identify the additional participant(s) when they engage in future conversations with a given user of the client device 110 using corresponding visual embedding(s) of the additional participant(s).

In some implementations, a speaker embedding of a user (e.g., a given user of the client device 110 and/or additional participants engaged in a conversation with the given user) can be mapped, across the speaker embedding space and the visual embedding space, to a corresponding visual embedding of the user. Accordingly, when a speaker embedding of the user is identified, the corresponding visual embedding of the user can also be identified even if no vision data including the user is captured by the client device 110. Further, when a visual embedding of the user is identified, the corresponding speaker embedding of the user can also be identified even if no audio data including spoken input of the user is detected by the client device 110. For instance, a speaker embedding for an additional participant "Bob" can be mapped to a first portion of the speaker embedding space that is associated with an identifier of "Bob" based on Bob being previously associated with the first portion of the speaker embedding space (e.g., based on user interface input detected at the client device 110), and a visual embedding for Bob can be mapped to a first portion of the speaker embedding space that is associated with an identifier of Bob based on Bob being previously associated with the first portion of the speaker embedding space (e.g., based on user interface input detected at the client device 110). The first portion of the speaker embedding space can be mapped to the first portion of the visual embedding space based on them both being associated with the identifier Bob. By mapping the speaker embedding of the user to the corresponding visual embedding of the user, both the speaker embedding of the user and the visual embedding of the user can be identified when only of them are identified by the identification engine 112.

Moreover, in some implementations, the identification engine 112 can utilize audio data that captures spoken input in conjunction with vision data that captures at least one user (e.g., a given user of the client device 110 and/or additional participants engaged in a conversation with the given user) to identify who spoke the spoken input captured in the audio data. The client device 110 can process audio data that captures spoken input of a user while also processing vision data that captures the at least one user, and can determine, based on processing of the audio data and the vision data, that the at least one user, spoke the audio data. For example, if a given user of the client device 110 is engaging in a conversation with three additional participants and the client device 110 captures audio data that includes spoken input, then the client device 110 can also capture vision data that includes the given user and the three additional participants. Further, the identification engine 112 can identify mouth movement of a given one of the three additional participants, and determine the audio data includes spoken input from the given one of the three additional participants based on an instance of the mouth movement overlapping with a time the audio data was captured. These implementations can be advantageous when a given user of the client device 110 is engaging in a conversation with a plurality of additional participants.

In some additional and/or alternative implementations, the identification engine 112 can process vision data that captures user(s) engaged in a conversation (e.g., a given user of the client device 110 and/or additional participants engaged in the conversation with the given user) to determine body pose and/or head pose of the user(s) engaged in the conversation. Further, the identification engine 112 can determine, based on the body pose and/or head pose of the user(s), the user, of the user(s), that provided spoken input detected at the client device 110 and/or an intended target(s), of the user(s) of the spoken input. In this manner, the identification engine 112 can identify user(s) engaged in the conversation even if spoken input from one or more of the user(s) is not detected at the client device 110. For example, assume a given user of the client device 110 is engaged in a conversation with a first additional participant "Bob" and a second additional participant "Jane". Further assume that the identification engine 112 processes vision data captured by the client device, and determines, based on the vision data, that Bob's body pose and/or head pose indicates that speech input detected by the client device 110 originates from Bob, and that it is directed to Jane (e.g., Bob is facing Jane, and Jane is facing Bob), even though neither Bob nor Jane are facing a given user of the client device 110 or the client device 110 itself.

In some versions of those implementations, the client device 110 can render one or more graphical elements on the client device 110 corresponding to each of the identified participant(s) based on determining the body pose and/or head pose of the additional participant(s) captured in the vision data indicates that a given user of the client device 110 is an intended target of the speech input detected at the client device 110. For example, if the client device 110 determines that spoken input from Bob is directed only to Jane (e.g., as indicated by Bob's body pose and/or head pose), then the given user of the client device 110 may not be an intended target of the spoken input from Bob and graphical elements corresponding to Bob and/or Jane may not be rendered at the client device 110, thereby indicating that the given user of the client device 110 is not a participant of the conversation between Bob and Jane. In contrast, if the client device 110 determines that spoken input from Bob is directed to both Jane and the given user of the client device 110 (e.g., as indicated by Bob's body pose and/or head pose), then the given user of the client device 110 may be an intended target of the spoken input from Bob and graphical elements corresponding to Bob and/or Jane may be rendered at the client device 110, thereby indicating that the given user of the client device 110 is a participant of the conversation between Bob and Jane. In some versions of those implementations, the client device 110 can render suggestion(s) on the client device 110 (e.g., using automatic suggestion engine 150) in response to determining the given user of the client device 110 is an intended target of the speech input detected at the client device 110. For example, if the client device 110 determines that spoken input from Bob is directed only to Jane (e.g., as indicated by Bob's body pose and/or head pose), then the given user of the client device 110 may not be an intended target of the spoken input from Bob and suggestion(s) may not be rendered at the client device 110. In contrast, if the client device 110 determines that spoken input from Bob is directed to both Jane and the given user of the client device 110 (e.g., as indicated by Bob's body pose and/or head pose), then the given user of the client device 110 may be an intended target of the spoken input from Bob and suggestion(s) that are responsive to the spoken input from Bob may be rendered at the client device 110. Moreover, in some further versions of those implementations, content included in the suggestion(s) can vary based on the identified additional participant(s) in the conversation.

In various implementations, the speech assistance system 160 can include speech recognition engine 120A2, speech synthesis engine 130A2, prosodic properties engine 140, and automatic suggestion engine 150. In some implementations, the speech assistance system 160 can be implemented locally by the client device 110. In additional and/or alternative implementations, the speech assistance system 160 can be implemented by server(s), and transmit data to and/or receive data from the client device 110 over network(s) 190 (e.g., Wi-Fi, Bluetooth, near-field communication, local area network(s), wide area network(s), and/or other networks). The data can include, for example, audio data that captures spoken input, an indication of identified user(s) in a conversation, sensor data generated by sensor(s) of the client device 110 (e.g., vision data generated by vision sensor(s), location data generated by a GPS sensor, accelerometer data generated by an accelerometer, gyroscopic data generated by a gyroscope, and/or other sensor data), prosodic properties, synthesized speech audio data, a speaker embedding of a given user of the client device 110, textual segment(s) corresponding to user interface input detected at the client device 110, candidate textual segment(s) included in one or more suggestions, semantic data for a conversation detected by the client device 110, predicted output generated over machine learning model(s), and/or any other data described herein. Although the speech assistance system 160 of FIG. 1 is described herein as being implemented by server(s), it should be understood that various engine(s) of the speech assistance system 160 and/or operations performed by the speech assistance system 160 can be located at and/or performed by the client device 110.

In some implementations, the speech recognition engine(s) 120A1 can process audio data that captures spoken input detected by the user interface input engine 111 to generate predicted output (e.g., recognized text). In some additional and/or alternative implementations, the client device 110 can transmit, to a speech assistance system 160 and over one or more networks 190 (e.g., Wi-Fi, Bluetooth, near-field communication, local area network(s), wide area network(s), and/or other networks), the audio data that captures the spoken input detected by the user interface input engine 111. The speech recognition engine(s) 120A1 and/or 120A2 can process, using speech recognition model(s) 120A, the audio data that captures the spoken input to generate recognized text. Further, the speech recognition engine(s) 120A1 and/or 120A2 can generate, based on the processed output, textual segment(s) that correspond to the spoken input that is to be conveyed in a conversation. In some implementations, the speech recognition model(s) 120A include a single speech recognition model that is trained to process audio data that captures spoken input regardless of the user that spoke the spoken input. In some other implementations, the speech recognition model(s) 120A include multiple speech recognition models that are each trained in different manners. For example, the speech recognition model(s) 120A can include a first speech recognition model that is trained to process audio data that captures spoken input that is spoken by speech-impaired users, and a second speech recognition model that is trained to process all other audio data that captures spoken input that is spoken by non-speech-impaired users. In some versions of those implementations, audio data that captures the spoken input can be applied as input across both the first speech recognition model and the second speech recognition model to generate first recognized text and second recognized text. The speech recognition engine(s) 120A1 and/or 120A2 can then select either the first recognized text or the second recognized text as corresponding to the spoken input based on confidence metrics associated with the first recognized text and the second recognized text. In some other versions of those implementations, audio data that captures spoken input can include an indication of an identified user associated with the spoken input, and if the identified user is a speech-impaired user, then the audio data associated with the spoken input can be applied as input across the first speech recognition model, and any audio data that captures spoken input of non-speech-impaired users can be applied as input across the second speech recognition model.

In some implementations, the speech recognition model(s) 120A are end-to-end speech recognition model(s), such that the speech recognition engine(s) 120A1 and/or 120A2 can generate textual segment(s) corresponding to spoken input directly using the model. For instance, the speech recognition model(s) 120A can be end-to-end model(s) used to generate the textual(s) segment on a character-by-character basis (or other token-by-token basis). One non-limiting example of such end-to-end model(s) used to generate the textual segment(s) on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency Cepstral coefficients (MFCCs) or other representation) to generate predicted output, an RNN-T model can be used to continuously process input samples and stream output symbols (e.g., characters of the alphabet). Also, for example, when the speech recognition model(s) are not an end-to-end speech recognition model(s), the speech recognition engine(s) 120A1 and/or 120A2 can instead generate predicted phoneme(s) (and/or other representations). For instance, with such models the predicted phoneme(s) (and/or other representations) are then utilized by the speech recognition engine(s) 120A1 and/or 120A2 to determine textual segment(s) that conform to the predicted phoneme(s). In doing so, the speech recognition engine(s) 120A1 and/or 120A2 can optionally employ a decoding graph, a lexicon, and/or other resource(s).

In some implementations, textual segment(s) corresponding to spoken input from a given user of the client device 110 can be used by the speech synthesis engine 130A1 and/or 130A2 (e.g., in addition to the speaker embedding for the given user of the client device 110) in generating synthesized speech audio data that represents speech of the given user of the client device 110. In some versions of those implementations, the textual segment(s) can be visually rendered, using the rendering engine 113 and by a user interface of the client device 110. In some implementations, textual segment(s) corresponding to spoken input from additional participant(s) engaged in a conversation with a given user of the client device 110 can also be visually rendered, using the rendering engine 113 and by a user interface of the client device 110. In this manner, a transcription of a conversation with a given user of the client device 110 and additional participant(s) in the conversation can be visually rendered on the client device 110.

The prosodic properties engine 140 can include, for example, a relationship engine 141, an environment engine 142, and a semantics engine 143. As described herein, the prosodic properties engine 140 can determine one or more prosodic properties to be used in synthesizing speech for a given user of the client device 110. As used herein, the "prosodic properties" can include, for example, one or more properties of syllables and larger units of speech, including linguistic functions such as intonation, tone, stress, rhythm, tempo, pitch, and pause. Further, by using the prosodic properties in generating synthesized speech for textual segment can, in combination, reflect, for example: emotional state; form (e.g., statement, question, or command); irony; sarcasm; and/or emphasis. In other words, the prosodic properties are features of speech that are independent of a given user's individual voice characteristics, and that can be dynamically adjusted during a conversation to change a baseline "voice" of synthesized speech and/or change the meaning of the textual segment included in the synthesized speech.

As described herein, the prosodic properties engine 140 can determine prosodic properties based on attribute(s) of a relationship, between a given user of the client device 110 and additional participant(s) engaged in a conversation with the given user, determined by the relationship engine 141; classification(s) of a location, where the conversation between the given user and the additional participant(s) of the conversation occurs, determined by the environment engine 142; and/or semantic(s) of the conversation, between the given user and the additional participant(s) of the conversation, determined by the semantics engine 143. In some implementations, the prosodic properties engine 140 can, in response to receiving spoken input from the given user of the client device 110, automatically determine the prosodic properties, automatically generate synthesized speech audio data that includes synthesized speech that is synthesized with the determined prosodic properties and that includes textual segment(s) included in the received spoken input from the given user, and audibly render the synthesized speech responsive to receiving the spoken input from the given user. In some other implementations, the prosodic properties engine 140 can, in response to receiving spoken input from the given user of the client device 110, automatically determine the prosodic properties and automatically generate synthesized speech audio data that includes synthesized speech that is synthesized with the determined prosodic properties and that includes textual segment(s) included in the received spoken input from the given user, but withhold audible rendering of the synthesized speech until a timeout period ends (e.g., three seconds, five seconds, and so on). During this timeout period, the given user can manually adjust the determined prosodic properties (e.g., as described with respect to FIGS. 4B-4D). In yet other implementations, the prosodic properties engine 140 can, in response to receiving spoken input from the given user of the client device 110, automatically determine the prosodic properties and automatically generate synthesized speech audio data that includes synthesized speech that is synthesized with the determined prosodic properties and that includes textual segment(s) included in the received spoken input from the given user, but refrain from audible rendering of the synthesized speech until further user interface input from the given user is detected by the user interface input engine 111 affirming that the synthesized speech should be audibly rendered. Not only does this allow the given user to manually adjust the determined prosodic properties (e.g., as described with respect to FIGS. 4B-4D), but the given user can also modify a transcription of the determined textual segment(s) (e.g., as described with respect to FIG. 4F).

The prosodic properties can be dynamically determined based on attribute(s) of a relationship between a given user of the client device 110 and additional participant(s) engaged in a conversation with the given user. In some implementations, the relationship engine 141 can determine attribute(s) of the relationship(s) between the given user of the client device 110 and the additional participant(s) engaged in the conversation with the given user based on whether the additional participant(s) are unknown user(s) or known user(s) (e.g., as determined by identification engine 112). In some versions of those implementations, when a given one of the additional participant(s) is an unknown user (e.g., determined based on no speaker embedding and no visual embedding being stored locally on the client device 110), the relationship engine 141 can assign an "unknown" attribute to the unknown user. Further, a set of default prosodic properties stored in prosodic properties database 140A can be mapped the unknown attribute. For example, the unknown attribute can be associated with the set of default prosodic properties that result in synthesized speech that is formal in tone and has a relatively slow tempo and/or rhythm. The synthesized speech may include a formal tone and relatively slow tempo and/or rhythm because the unknown user may not be familiar with the given user's synthesized voice. In some further versions of those implementations, when a given one of the additional participant(s) is an unknown user, a prompt can be rendered at the client device 110 requesting authorization to store a speaker embedding and/or visual embedding of the unknown user locally at the client device 110, such that the unknown user can become a known user and recognized in future conversations with a given user of the client device 110.

In some versions of those implementations, when a given one of the additional participant(s) is an a particular known user (e.g., identified based on a speaker embedding and/or visual embedding stored locally on the client device 110), the relationship engine 141 can determine attribute(s) of a relationship between a given user of the client device and the particular known user. The attribute(s) can include, for example, a quantity of interactions (e.g., conversational interactions, telephone calls, text messaging interactions, SMS messaging interactions, email interactions, and/or other interaction) between the given user and the particular known user, a frequency of interactions between the given user and the particular known user, and/or semantic identifiers or indication(s) of the relationship between the given user and the particular known user (e.g., semantic indication(s) such as boss, friend, close friend, co-worker, family member, and/or other semantic indication(s)). In some further versions of those implementations, the attribute(s) associated with the particular known user can be stored in relationship attribute(s) database 141A. In some examples, a graphical indication or element may be displayed or rendered on the client device, and the graphical indication or element comprises a semantic identifier or indication of an additional user or participant.

In some further versions of those implementations, different groupings of prosodic properties stored in prosodic properties database 140A can be mapped to the different attribute(s). For instance, a boss attribute can be mapped to a first set of prosodic properties that can result in synthesized speech that is more formal in tone and that avoids sarcasm. Also, for instance, a close friend attribute and/or a frequent interaction attribute can be mapped to a second set of prosodic properties that can result in synthesized speech that is casual in tone and has a relatively fast tempo. The faster tempo can enable the synthesized speech to be rendered more quickly at the client device 110, and a resulting conversation to be concluded more quickly. Although the faster tempo can potentially make the synthesized speech more difficult to understand, utilizing the faster tempo responsive to determining the close friend and/or frequent interaction attribute(s) can mitigate this risk in view of the close friend and/or frequent interaction attribute(s) indicating familiarity of the synthesized voice. In these and other manners, prosodic properties that lead to quicker rendering of synthesized speech (and shorter duration of utilization of associated computational resources) can be selectively utilized, balancing such efficiencies with relationship attribute(s) that indicate risk of needing to repeat the rendering if the synthesized speech is not understood. Moreover, the relationship attribute(s) can be updated as the given user of the client device 110 and the particular known user interact over time.

In some implementations, if the conversation includes multiple additional participants, then the prosodic properties engine 140 can utilize an average of the prosodic properties for each of the additional participants in the conversation as the determined prosodic properties to be used in generating synthesized speech for a given user of the client device 110. For example, if the given user of the client device 110 is engaged in a conversation with the given user's boss (e.g., associated with the first set of prosodic properties that can result in synthesized speech that is more formal in tone and that avoids sarcasm as indicated above), and a close friend (e.g., associated with the second set of prosodic properties that can result in synthesized speech that is casual in tone and has a relatively fast tempo), then the determined set of prosodic properties can result in synthesized speech that includes some sarcasm and a moderate tempo to include slower speech than if the given user was simply having a conversation with the boss or the close friend, individually. In some other implementations, if the conversation includes multiple additional participants, then the prosodic properties engine 140 can utilize the prosodic properties, from among the prosodic properties determined for each of the additional participants, that correspond to more formal speech as the determined prosodic properties to be used in generating synthesized speech for a given user of the client device 110. In this way, responsive to determining that the relationship between the given user and an additional participant is more formal than the additional relationship between the given user and a further additional participant, the one or more prosodic properties can be based on the attributes of the relationship between the given user and the additional participant, in lieu of (or instead of) using one or more additional attributes of the additional relationship between the given user and the further additional participant. For example, if the given user of the client device 110 is engaged in a conversation with the given user's boss (e.g., associated with the first set of prosodic properties that can result in synthesized speech that is more formal in tone and that avoids sarcasm as indicated above), and a close friend (e.g., associated with the second set of prosodic properties that can result in synthesized speech that is casual in tone and has a relatively fast tempo), then the determined set of prosodic properties can be the first set of prosodic properties since it is associated with more formal speech.

The prosodic properties can additionally and/or alternatively be dynamically determined based on classification(s) and/or other features of a location of a conversation occurs between a given user of the client device 110 and additional participant(s) engaged in the conversation with the given user. In some implementations, the environment engine 142 can determine the location of the conversation based on sensor data (e.g., location data generated by a GPS sensor of the client device 110) generated by the client device 110, and transmitted to the speech assistance system 160 over the network(s) 190. The location can be compared to known locations (e.g., the given user's home, the given user's place of work), and/or compared to a map to identify other locations. In some versions of those implementations, different groupings of prosodic properties stored in the prosodic properties database 140A can be mapped to the different classification(s) of the location of the conversation. For example, a first set of prosodic properties can be determined and utilized at a location having a home classification (i.e., a home classification relative to the given user—the given user's home), a second set of prosodic properties can be determined and utilized at a location having a work classification (i.e., a work classification relative to the given user—the given user's place of work), a third set of second set of prosodic properties can be determined and utilized at a location having a coffee shop classification (common to all users), a fourth set of prosodic properties can be determined and utilized at a location having a bar classification (common to all users), and a fifth set of prosodic properties can be determined and utilized at a location having a restaurant classification (common to all users).

The prosodic properties can additionally and/or alternatively be dynamically determined based on semantic(s) of a conversation between a given user of the client device 110 and additional participant(s) engaged in the conversation with the given user. In some implementations, the semantics engine 143 can process features of prior spoken input and/or features of prior textual segment(s) corresponding to the prior spoken input from the additional participant(s) in the conversation. Further, the semantics engine 143 can also process features of corresponding responsive spoken input and/or features of responsive textual segment(s) corresponding to responsive spoken input from the given user, where the responsive spoken input from the given user is responsive to the prior spoken input from the additional participant(s). Based on processing the prior textual segment(s) and/or the textual segment(s), the semantics engine 143 can determine a set of prosodic properties that reflect semantic features in context of the conversation. For example, assume a given user of the client device 110 is being deposed, and responsive to a question of "Why did you say she stole your money?" from an additional participant in the deposition, the given user responds "I never said she stole my money". In this instance, if a first set of prosodic properties results in synthesized speech that includes stress on the word "stole", then the synthesized speech may indicate that the money may or may not have been stolen, but the given user that provided the spoken input never previously indicated whether or not the money was actually stolen. In contrast, if a second set of prosodic properties results in synthesized speech that includes stress on the word "never", then the synthesized speech may indicate that the money was not actually stolen, and the given user that provided the spoken input is ensuring that any previous statements about the money are not improperly construed. Further, if a third set of prosodic properties results in synthesized speech that includes a harsh or firm tone and fast rhythm for the entire phrase "I NEVER SAID SHE STOLE MY MONEY", then the synthesized speech may indicate that the given user is angered by the question and/or that the given user has a strong conviction that the given user never previously indicated that she stole the money. However, if the synthesized speech is simply synthesized with baseline "voice" for the given user, without any adaptation based on prosodic properties, then the actual meaning of the synthesized phrase "I never said she stole my money" may be lost.

Accordingly, the prosodic properties engine 140 can consider a first set of prosodic properties determined by the relationship engine 141, a second set of prosodic properties determined by the environment engine 142, and/or a third set of prosodic properties determined by the semantics engine 143 in determining a set of determined prosodic properties for use in generating a synthesized speech for the given user of the client device 110. For example, if the given user is engaged in a conversation with a close friend at the given user's home, then the prosodic properties engine 140 may determine a fourth set of prosodic properties, based on the first set of prosodic properties and the second set of prosodic properties, since the given user's home is a private location where the given user can speak freely, such that the conversation includes a fast tempo and casual tone. However, if the given user and the close friend engage in a heated debate, then the prosodic properties engine 140 may determine a fifth set of prosodic properties, based on the third set of prosodic properties and the fourth set of prosodic properties, to include more emotion and/or more emphasis or stress that on a particular word or phrase. As another example, if the given user is engaged in a conversation with a close friend at a bar, then the prosodic properties engine 140 may determine a fourth set of prosodic properties, based on the first set of prosodic properties and the second set of prosodic properties, as the determined set of prosodic properties that retains a casual tone but includes a slower tempo to account for louder ambient noise in a bar environment as compared to a fast tempo being used in the given user's home as indicated by the prior example. As yet another example, if the given user is engaged in a conversation with a close friend at a coffee shop, then the prosodic properties engine 140 may determine a fourth set of prosodic properties, based on the first set of prosodic properties and the second set of prosodic properties, as the determined set of prosodic properties that includes a faster tempo but includes a more formal tone to account for softer ambient noise in a coffee shop environment as compared to being at a more casual bar. Thus, the prosodic properties engine 140 can determine a set of prosodic properties for use in generating synthesized speech for the given user of the client device 110 based on the relationship attribute(s), the classification(s) of the location of the conversation, semantics of the conversation, and/or other factor(s).

As described herein, synthesized speech audio speech can be generated, and can include synthesized speech that is synthesized using a speaker embedding of a given user of the client device 110, that is synthesized with determined prosodic properties, and that includes textual segment(s) determined based on user interface detected at the client device 110. When the synthesized speech is synthesized using the speaker embedding of the given user of the client device 110, the synthesized speech can represent a baseline "voice" of synthesized speech for the given user of the client device 110. However, when the synthesized speech is also synthesized with the determined prosodic properties, the baseline voice of the synthesized speech for the given user of the client device 110 can be adjusted. As noted above, the determined prosodic properties can be utilized to change the baseline voice of synthesized speech for the given user and/or change the meaning of the textual segment included in the synthesized speech. Thus, the determined prosodic properties are not utilized to generate a first male synthesized voice vs. a second male synthesized voice, a male synthesized voice vs. a female synthesized voice, or a synthesized voice in a first language vs. a synthesized voice in a second language. Rather, the synthesized speech described herein can utilize the determined prosodic properties to change the baseline voice of the synthesized speech and/or the meaning of the synthesized speech. For example, the same baseline voice can be a function of using the same speaker embedding to generate synthesized speech, and the prosodic properties can change the baseline voice of the synthesized speech and/or the meaning of the synthesized speech. In some of those examples, speech synthesis models can utilize different speaker embeddings to generate synthesized speech, and the prosodic properties can change the baseline voice of the synthesized speech and/or the meaning of the synthesized speech for each of the speech synthesis models. Thus, the generated synthesized speech can differ in response to receiving the same spoken input from the given user of the client device based on the determined prosodic properties.

In some implementations, the speech assistance system 160 can transmit, to the client device 110 and over the network(s) 190, determined prosodic properties to be used in synthesizing speech for a given user of the client device 110, and the speech synthesis engine 130A1 can generate, using speech synthesis model(s) 130A, synthesized speech audio data. In some other implementations, the speech assistance system 160 can receive, from the client device 110 and over the network(s) 190, a speaker embedding associated with a given user of the client device 110 and textual segment(s) corresponding to spoken input of the given user of the client device 110. The speech synthesis engine(s) 130A1 and/or 130A2 can generate, using speech synthesis model(s) 130A, the synthesized speech audio data, using a speaker embedding associated with a given user of the client device 110, that includes synthesized speech that is synthesized with determined prosodic properties, and that includes textual segment(s) corresponding to spoken input of a given user of the client device 110. For example, the speech synthesis engine(s) 130A1 and/or 130A2 can determine a sequence of phonemes determined to correspond to textual segment(s) corresponding to spoken input of a given user of the client device 110, and process the sequence of phonemes using the speech synthesis model(s) 130A, to generate synthesized speech audio data. The synthesized speech audio data can be, for example, in the form of an audio waveform. In determining a sequence of phonemes that correspond to the textual segment(s) corresponding to spoken input of a given user of the client device 110, the speech synthesis engine(s) 130A1 and/or 130A2 can access a tokens-to-phonemes mapping stored locally at the client device 110.

In some implementations, the speech synthesis engine(s) 130A1 and/or 130A2 can generate, using speech synthesis model(s) 130A, the synthesized speech audio data by applying a speaker embedding associated with a given user of the client device 110, determined prosodic properties, and textual segment(s) corresponding to spoken input of a given user of the client device 110 as input across the speech synthesis model(s) 130A. Accordingly, synthesized speech, included in the synthesized speech audio data, represents not only content of the spoken input of the given user of the client device 110 (e.g., via the textual segment(s)), but the synthesized speech also represents varying prosodic properties for different scenarios in which the spoken input is received (e.g., as described with respect to FIGS. 3 and 4A-4F). In some other implementations, the speech synthesis engine(s) 130A1 and/or 130A2 can generate, using the speech synthesis model(s) 130A, the synthesized speech audio data by applying a speaker embedding associated with a given user of the client device 110, and textual segment(s) corresponding to spoken input of a given user of the client device 110 as input across the speech synthesis model(s) 130A. In some versions of those implementations, the speech synthesis engine(s) 130A1 and/or 130A2 can further process (e.g., post-processing), using various audio processing techniques, the synthesized speech audio data to incorporate determined prosodic properties after the synthesized speech audio data is generated. Accordingly, synthesized speech, included in the synthesized speech audio data, represents baseline synthesized speech content of the spoken input of the given user of the client device 110 (e.g., via the textual segment(s)), and the further processing adjusts the synthesized speech to also represents varying prosodic properties for different scenarios in which the spoken input is received (e.g., as described with respect to FIGS. 3 and 4A-4F). In yet other implementations, the speech synthesis engine(s) 130A1 and/or 130A2 can generate, using the speech synthesis model(s) 130A, the synthesized speech audio data by applying textual segment(s) corresponding to spoken input of a given user of the client device 110 as input across the speech synthesis model(s) 130A. In some versions of those implementations, the speech synthesis model(s) utilize a speaker embedding associated with the speech synthesis model(s) 130A to generate the synthesized speech. In some versions of those implementations, the prosodic properties can also be applied as input across the speech synthesis model(s) 130A along with the textual segment(s) as described above, or the prosodic properties can be incorporated into the synthesized speech using post-processing as described above.

In some implementations, the client device 110 can audibly render, using the rendering engine 113 and by speaker(s) of the client device and/or additional client device(s), synthesized speech, included in synthesized speech audio data, that represents spoken input from a given user of the client device 110. The synthesized speech is synthesized with determined prosodic properties, and includes textual segment(s) corresponding to the spoken input of the given user of the client device 110, and can be used as a proxy for the given user's actual speech for conveying or providing information in a conversation. In some other implementations, the speech assistance engine 160 can transmit, to the client device 110 and over the network(s) 190, synthesized speech audio data. In some versions of those implementations, synthesized speech, included in the synthesized speech audio data, can be audibly rendered, using the rendering engine 113 and by speaker(s) of the client device and/or additional client device(s), responsive to the synthesized speech audio data being received at the client device 110. Techniques described herein can be advantageous when a given user of the client device 110 is speech-impaired since the synthesized speech can be used as a proxy for the given user's actual speech, and dynamically adapted to various different scenarios in which the spoken input of the given user of the client device 110 is received (e.g., as described with respect to FIGS. 3 and 4A-4F). Notably, in some implementations, spoken input detected by the user interface input engine 111 is a first language, and generated synthesized speech, corresponding to the spoken input detected by the user interface input engine 111, is also in the first language.

The automatic suggestion engine 150 can determine candidate textual segment(s) to be conveyed in a conversation, and can present the candidate textual segment(s) as suggestion(s) for inclusion in synthesized speech for a given user of the client device 110. In some implementations, the candidate textual segment(s) can be transmitted to the client device 110 over the networks(s) 190. Further, the candidate textual segment(s) be visually rendered, using rendering engine 113 and by a user interface of the client device 110, as suggestion(s) for presentation to a given user of the client device 110. In some versions of those implementations, the suggestion(s) can be selectable, such that when user interface input is directed to the suggestion(s) (e.g., as determined by the user interface input engine 111), the selected suggestion can be incorporated into the synthesized speech that is audibly rendered by the client device 110. In this manner, a given user of the client device 110 can select a given one of the suggestion(s), and synthesized speech for a given user of the client device 110 can be generated that includes the candidate textual segment(s) of the selected suggestion(s). Notably, synthesized speech that represents speech of a given user of the client device 110 and that includes the selected candidate textual segment(s) can be generated even though the given user did not provide any spoken input corresponding to the selected candidate textual segment(s). Thus, the synthesized speech for a given user of the client device 110 can still represent speech of the given user because the synthesized speech is synthesized using a speaker embedding of the given user of the client device 110

(e.g., one that corresponds to the given user's actual speech or one that does not correspond to the given user's actual speech but is selected based on feedback from the user).

The automatic suggestion engine 150 can generate candidate textual segment(s) based on context of a conversation between a given user of the client device 110 and additional participant(s) engaged in the conversation with the given user. In some implementations, the automatic suggestion engine 150 can generate candidate textual segment(s) that include content in the context of initiating a conversation, by a given user of the client device 110, prior to detecting any spoken input at the client device 110. In some versions of those implementations, the automatic suggestion engine 150 can generate candidate textual segment(s) that include content to initiate a conversation responsive to one or more software applications being launched. For example, if a given user of the client device 110 launches an automated assistant application and the client device has not detected speech input that does not belong to the user, then candidate textual segment(s) to initiate a conversation (e.g., "Hello, how are you doing?" "Hi, how has your day been?", "What's up?", and so on) can be visually rendered for presentation to the given user by a user interface of the client device 110. Further, the content included the candidate textual segment(s) can also identify additional participant(s) in the conversation if the additional participant(s) are known users (e.g., "Hi, Jim", "What's up, Jim?" and so on). In some other versions of those implementations, the automatic suggestion engine 150 can generate candidate textual segment(s) that include content to initiate a conversation responsive to determining that user interface input to provide spoken input is detected at the client device 110, but that no spoken input is received at the client device 110 within a threshold amount of time of receiving the user interface input (e.g., within three seconds, four seconds, five seconds, etc.). For example, if a given user of the client device 110 directs user interface input to a graphical element that, when selected, enables the given user to provide spoken, but no spoken input is received within four seconds of selecting the graphical element, then candidate textual segment(s) to initiate a conversation can be visually rendered for presentation to the given user by a user interface of the client device 110.

In some implementations, the automatic suggestion engine 150 can generate candidate textual segment(s) that include content in the context of responding to spoken input of additional participant(s) engaged in a conversation with a given user of the client device 110 (e.g., candidate textual segment(s) that are responsive to textual segment(s) corresponding to spoken input of additional participant(s)). In some versions of those implementations, the automatic suggestion engine 150 can generate, using prediction model(s), candidate textual segment(s) based on applying features of textual segment(s) corresponding to spoken input of additional participant(s) as input across the prediction model(s). The prediction model(s) can include, for example, a LSTM neural network model and/or other machine learning model trained based on a large corpus of textual segment(s) and corresponding textual segment(s) from a plurality of users that are responsive to the textual segment(s). The features of the textual segment(s) can include tokens (e.g., textual token(s) and/or graphical token(s)) from the textual segment(s) and the automatic suggestion engine 150 applies the tokens as input across one or more of the prediction models to generate output indicative of candidate textual segment(s). The applied tokens from the textual segment(s) may include all of the tokens, or one or more subsets of the tokens (e.g., first sentence and/or last sentence included in the textual segment(s), all of the textual segment(s) with stopwords omitted). The automatic suggestion engine 150 then uses the output to determine candidate textual segment(s). For example, the automatic suggestion engine 150 may apply the tokens as input across the prediction model(s) on a sequential token by token basis to generate, over the model, one or more outputs that each indicate a probability distribution over words.

The automatic suggestion engine 150 utilizes the output(s) of the prediction model(s) to determine a set of candidate textual segment(s) and to assign scores to (or otherwise rank) the candidate textual segment(s). In some implementations, the candidate textual segment(s) are identified from a whitelist of candidate textual segment(s), such as a curated list of common responses. In some implementations, one or more of the candidate textual segment(s) may additionally or alternatively be generated in an unrestricted token by token manner (i.e., not identified from a whitelist of common responses). Regardless of the technique(s) utilized, the automatic suggestion engine 150 may identify a number of candidate textual segment(s) (e.g., 3, 5, 10, or more) and may optionally rank the identified candidate textual segment(s) based on, for example, scores assigned to the candidate textual segment(s) based on the output generated over the prediction model(s). The ranking of the candidate textual segment(s) may be conveyed as scores for the candidate textual segment(s), an ordering of the candidate textual segment(s) (e.g., a list where the first candidate textual segment is the most highly ranked, the second candidate textual segment is the next most highly ranked, and so on), etc.

The candidate textual segment(s) can be visually rendered for presentation to a given user of the client device 110 as suggestion(s) to be incorporated in synthesized speech for the given user. In some implementations, the automatic suggestion engine 150 may only identify up to X candidate textual segment(s) as suggestion(s) (where X is a positive integer greater than or equal to one) and/or use thresholding to identify only candidate textual segment(s) as suggestion(s) that have at least a threshold degree of conformance to the output generated over the prediction model(s). In some versions of those some implementations, one or more of the suggestion(s) can be visually rendered more prominently than one or more of the other suggestion(s) (e.g., as described in more detail herein with respect to FIGS. 4B, 4C, and 4F). In some versions of those implementations, the suggestion(s) that are visually rendered at the client device 110 may only include candidate textual segment(s) that are semantically diverse. The automatic suggestion engine 150 can determine that candidate textual segment(s) are semantically diverse based on generating, over an encoder model, a plurality of candidate textual segment embeddings that are each based on one of the plurality of the candidate textual segment(s). The generated candidate textual segment embeddings can be a lower-dimensional representation mapping the candidate textual segment(s) to a lower-dimensional candidate textual segment embedding space. The embedding for a given one of the candidate textual segment(s) may be compared to embedding(s) of candidate textual segment(s) already selected as one of the suggestion(s), and the given one of the candidate textual segment(s) can be identified as a suggestion only if the comparing indicates difference metric(s) is satisfied. For example, the difference metric(s) may be satisfaction of a threshold that indicates a sufficient degree of semantic difference between the given candidate textual segment and already selected candidate textual segment.

Determining and providing a semantically diverse candidate textual segment(s) as suggestion(s) may increase the likelihood that one of the candidate textual segment(s) is sufficient to convey the essence of an intended response of the user. As a result, a likelihood that a user will select one of the candidate textual segment(s) for inclusion in synthesized speech may be increased. Further, selecting one of the suggestion(s) will reduce the number of user inputs that a user must make, which may reduce the usage of various client device computational resources and/or be of particular benefit to users that have low dexterity (or who otherwise have difficulties making user inputs to the client device 110).

Moreover, in some implementations, the candidate textual segment(s) can be determined based on an environment of a conversation between a given user of the client device and additional participant(s) in a conversation, and/or a relationship between the given user of the client device and additional participant(s) in the conversation. For example, if the conversation occurs and the given user's home and is between the given user and the given user's daughter, then the determined candidate textual segment(s) may include more jovial and lighthearted textual segment(s). As another example, if the conversation occurs at the user's home and is between the given user and the given user's friend, then the determined candidate textual segment(s) may include more slang and sarcastic textual segment(s). In contrast, if the conversation occurs at a coffee shop and is between the given user and the given user's friend, then the determined candidate textual segment(s) may include less slang in textual segment(s), but may still include sarcastic textual segment(s). In some implementations, determining whether a textual segment is jovial, sarcastic, or has other type(s) can be based on an embedding for the textual segment. For example, an embedding for the textual segment can be determined as described in the previous paragraph. Further, that embedding, or a region of embedding space within which that embedding is contained, can be labeled with one or more types (e.g., sarcastic), thereby indicating that the embedding (and thus, the textual segment) has the type(s). Accordingly, a sarcastic textual segment can be selected, from a plurality of candidate responses, based on determining that an embedding for the textual segment is mapped to a sarcastic label.

As candidate textual segment(s) are determined, the candidate textual segment(s) can be stored in candidate textual segment(s) database 150A to quickly and efficiently access previously determined candidate textual segment(s). Further the candidate textual segment(s) stored in the candidate textual segment(s) database 150A can be indexed by type and/or frequency of use of particular candidate textual segment(s). The types of candidate textual segment(s) can include, for example, candidate textual segment(s) that initiate conversations, candidate textual segment(s) that include laughter, candidate textual segment(s) associated with a home environment, candidate textual segment(s) associated with a work environment, candidate textual segment(s) associated with a public environment, candidate textual segment(s) associated with restaurant service (e.g., "Water, please", "I'll have the cheeseburger", and so on), candidate textual segment(s) associated with friends, candidate textual segment(s) associated with family, and/or other types for indexing the candidate textual segment(s). By using the speech assistance system 160, the automatic suggestion engine 150 can learn common term(s), phrase(s), response(s), slang, and/or other speech commonly used by a given user of the client device 110, and the candidate textual segment(s) database 150A, or indices thereof, can be updated to include these textual segment(s). In this manner, the speech assistance system 160 can provide suggestion(s) that are more useful to the user of the client device, and, as a result, spoken user input can be reduced at the client device 110 and corresponding computational resource(s) for processing the spoken user input (and/or network resource(s) for the transmission thereof) can be reduced.

Figure 2B:
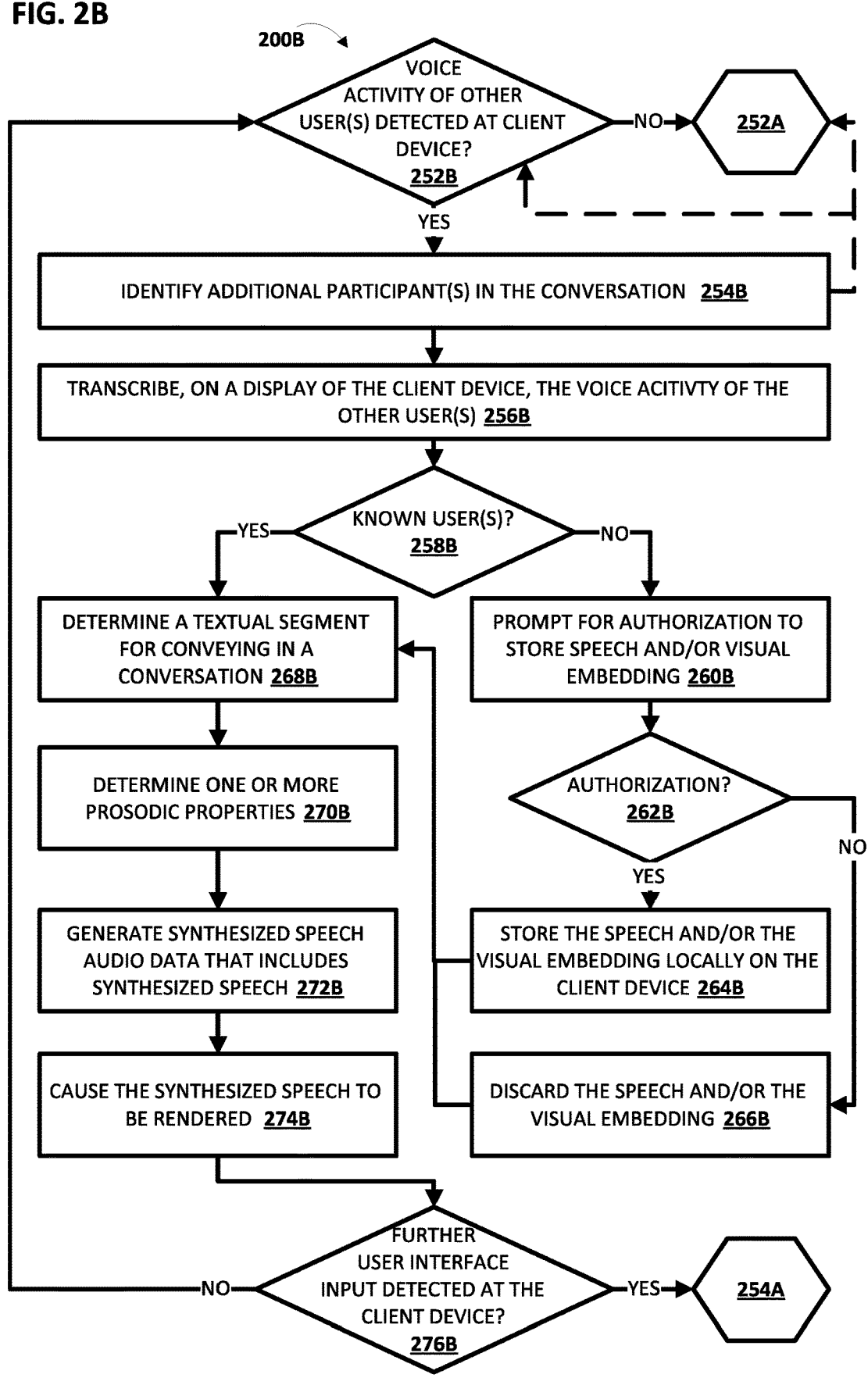

FIGS. 2A and 2B depicts a flowchart illustrating example methods 200A and 200B of generating synthesized speech that is synthesized with one or more prosodic properties, in accordance with various implementations. For convenience, the operations of methods 200A and 200B are described with reference to a system that performs the operations. This system of methods 200A and 200B includes one or more processors and/or other component(s) of a computing device (e.g., client device 110 of FIG. 1, client device 410 of FIGS. 3 and 4A-4F, computing device 510 of FIG. 5, one or more servers, and/or other computing devices). Moreover, while operations of method 200A and 200B are shown in a particular order, this is not meant to be limiting. One or more operations may be reordered, omitted, or added.

Although operations of method 200A are described herein as occurring prior to operations of method 200B, that is for ease in explanation only and is not meant to be limiting. It should be noted that operations of method 200A can be performed prior to operations of method 200B, operations of method 200B can be performed prior to operations of method 200A, or operations of methods 200A and 200B can be performed in parallel. In various implementations, an order of operations of methods 200A and 200B may be based on flow of a conversation between a given user and one or more additional participants in the conversation. As one non-limiting example, if a given user initiates a conversation, then operations of method 200A may be performed prior to operations of method 200B to provide speech assistance for the given user by generating synthesized speech that is synthesized with one or more prosodic properties. As another non-limiting example, if a given user is responding to one or more additional participants in a conversation, then operations of method 200B may be performed prior to operations of method 200A to provide speech assistance for the given user by generating synthesized speech that is synthesized with one or more prosodic properties. However, given the dynamic nature of conversations, between users, operations of methods 200A and 200B can also be performed in parallel as a given user and one or more additional participants engage in a conversation.

Turning initially to both FIGS. 2A and 2B, at block 252A of FIG. 2A, the system monitors for user interface input at a client device of a given user. The user interface input at the client device of the given user can include spoken input of the given user and/or selection of a graphical element that conveys a textual segment. In implementations where the user interface input is spoken input of the given user, the spoken input can be detected via one or more microphones of the client device, and can be detected responsive to detecting a particular hotword or phrase (e.g., responsive to detecting "Ok, Assistant", "Assistant", and/or other particular hotwords or phrases) included in the spoken input, responsive to detecting the spoken input without any particular hotwords or phrases using one or more hotword-free techniques (e.g., responsive to detecting mouth or lip movement(s) of the given user, gaze(s) of the given user directed to the client device, gesture(s) of the given user directed to the client device, and/or other hotword-free techniques), or responsive to receiving an indication to provide the spoken input (e.g., selection of a hardware or software button of the client device, a squeeze of the client device, and/or other indications for providing the spoken input). Further, the spoken input can be processed using one or more speech recognition models (e.g., speech recognition model(s) 120A of FIG. 1). In implementations where the user interface input is selection of a graphical element that conveys a textual segment, the graphical element can be one of a plurality of graphical elements displayed on a user interface of the client device, and the textual segment can be a textual segment that initiates a conversation with one or more additional participants in the conversation or that is responsive to additional user spoken input of one or more of the additional participants in the conversation.

If, at an iteration of block 252A of FIG. 2A, the system determines that no user interface input is detected at the client device of the given user, then the system may proceed to block 252B of FIG. 2B. Blocks 252A of FIG. 2A and 252B of FIG. 2B can also be performed in parallel. At block 252B of FIG. 2B, the system monitors for voice activity of one or more other users at the client device (e.g., additional participant(s) in the conversation). Notably, the voice activity can be detected in an environment of the client device of the given user via one or more microphones of the client device, but it is not from the given user of the client device. Determining that there is voice activity that is not from the given user based on the speaker identification can comprise: generating, at the client device, a spoken input embedding based on processing the additional user spoken input; and determining that the spoken input embedding does not match a pre-stored embedding for the given user. Rather, the voice activity originates from additional user(s) that are in the environment of the client device of the given user. In some implementations, the voice activity includes additional user spoken input that is directed to the given user of the client device, and the voice activity can be processed using one or more speech recognition models (e.g., speech recognition model(s) 120A of FIG. 1).

If, at an iteration of block 252B of FIG. 2B, the system determines that user voice activity of one or more other users is detected at the client device of the given user, then the system may proceed to block 254BA of FIG. 2B. However, if, at an iteration of block 252B of FIG. 2B, the system determines that no user voice activity of one or more other users is detected at the client device of the given user, then the system may return to block 252A of FIG. 2A. In this manner, the system can, at least selectively (e.g., when activated based on user input), continuously monitor for user interface input of the given user at the client device at block 252A of FIG. 2A and/or voice activity of other users in an environment of the client device of the given user at block 252B of FIG. 2B. By continuously monitoring for the user interface input of the given user at block 252A of FIG. 2A and for the voice activity of the other users at block 252B of FIG. 2B, the techniques described herein provide speech assistance for the given user that can be dynamically adapted in conversations between the given user and one or more other users.

Turning now to FIG. 2A, if, at an iteration of block 252A, the system determines that user interface input is detected at the client device of the given user, the system may proceed to block 254A. At block 254A, the system determines, based on the user interface input at the client device of the given user, a textual segment for conveying in a conversation. In some implementations, block 254A can include one or more sub-blocks. If the user interface input includes spoken input of the given user, at sub-block 254A1, the system can determine the textual segment based on processing the spoken input of the given user using a speech recognition model (e.g., speech recognition model(s) 120A of FIG. 1). In implementations that include sub-block 254A1, the client device of the given user can detect the spoken input of the given user using one or more microphones. If the user interface input includes selection of a graphical element, at sub-block 254A2, the system can determine the textual segment based on the selection of a graphical element that conveys the textual segment. In implementations that include sub-block 254A2, the graphical element can be rendered responsive to the given user providing an indication to initiate a conversation and/or responsive to detecting voice activity of one or more other users in the conversation. Further, the graphical element can be one of a plurality of graphical elements, and each of the graphical elements can include different suggestions of candidate textual segments that either initiate the conversation on behalf of the given user and/or that are responsive to the voice activity of one or more of the other users in the conversation. The suggestions of the candidate textual segments and the selection thereof is described in more detail herein (e.g., with respect to FIGS. 1 and 4B, 4C, and 4F). It should be noted that, in some implementations, the suggestions can vary based on a relationship between the given user and one or more of the other users in the conversation.

At block 256A, the system identifies one or more additional participants in the conversation. The one or more additional participants in the conversation can include the one or more of the other users whose voice activity was detected in the environment of the client device of the given user. Notably, the one or more additional participants in the conversation may already be identified based on prior turns in the conversation as described above with monitoring for the user interface input at client device and/or monitoring for the voice activity of one or more of the other users in the environment of the client device. In some implementations, block 256A can include one or more sub-blocks. If the system has detected voice activity of one or more of the other users, at sub-block 256A1, the system identifies one or more of the other users as the additional participant(s) by performing speaker identification on additional user spoken input detected via one or more of the microphones of the client device of the given user. In implementations that include sub-block 256A1, the additional user spoken input can be processed, using one or more speech recognition models (e.g., speech recognition model(s) 120A of FIG. 1) to generate a speaker embedding (or a spoken input embedding) for a corresponding one of the additional participant(s) that provided the additional user spoken input. As described herein (e.g., with respect to FIGS. 1 and 2B), the speaker embedding can be compared to a plurality of (pre-stored) speaker embeddings stored locally on the client device to identify whether a matching speaker embedding for the corresponding one of the additional participant(s) is stored locally on the client device. In other words, a spoken input embedding can be generated based on processing the additional user spoken input, and it can be determined whether the spoken input embedding matches a pre-stored embedding for the additional user or participant; the additional participant may therefore be identified. Optionally the pre-stored embedding for the additional user is previously stored locally at the client device responsive to authorization by the additional user. In some examples, a semantic identifier of the additional user may be stored or otherwise associated with the pre-stored embedding.

At sub-block 256A2, the system can additionally or alternatively identify one or more of the additional participants by processing an image that captures the multiple humans, including the additional participant(s). For example, the system can perform sub-block 256A2 if voice activity of one or more other users is not detected at sub-block 256A2. The image can be captured by one or more vision sensors (e.g., camera(s)) of the client device of the given user. The camera may comprise an adjustable viewport, and the image (or images) can be captured subsequent to adjustment of the adjustable viewport. The adjustment can be responsive to user interface input at the client device; for example, the user may angle the viewport, or zoom in on one or more participants. In implementations that include sub-block 256A1, the image can be rendered on a user interface of the given client device, the given user can designate an area of the image that includes a corresponding one of the additional participants (e.g., selecting a face, drawing a bounding box around a face, and/or other techniques for designating an area of the image), and the area of the image can be processed, using one or more image processing techniques, to generate a visual embedding of the corresponding one of the additional users; the user can thus designate to exclude other participants or humans within the image from the processing, which can conserve computational resources which would otherwise be unnecessarily expended. As described herein (e.g., with respect to FIGS. 1 and 2B), the visual embedding can be compared to a plurality of visual embeddings stored locally on the client device to identify whether a matching visual embedding for the corresponding one of the additional participant(s) is stored locally on the client device. In some additional and/or alternative implementations, the system can also identify additional participant(s) in the conversation based on processing vision data to determine body pose and/or head pose of user(s) captured in the vision data (e.g., as described with respect to FIG. 1). In this manner, the system can identify each of the additional participant(s) based on corresponding speaker embedding(s) and/or visual embedding(s).

At block 258A, the system determines one or more prosodic properties. As described herein (e.g., with respect to FIGS. 3 and 4A-4F), one or more of the prosodic properties determined at block 258A can vary based on one or more of the additional participants in the conversation identified at block 256A. In some implementations, block 258A can include one or more sub-blocks. At sub-block 258A1, the system can determines one or more of the prosodic properties based on one or more attributes of a relationship between the given user and the additional participant(s) in the conversation. At sub-block 258A2, the system can determine one or more of the prosodic properties based on classification(s) of a location of the client device where the given user engages in the conversation with the additional participant(s) (e.g., home environment, work environment, public environment, and so on). It should be noted that the one or more prosodic properties can be based on determinations at sub-block 258A1, sub-block 258A2, and/or other determinations. Examples of the prosodic properties and how the prosodic properties vary based on these determinations is described in more detail herein (e.g., with respect to FIGS. 1, 3, and 4A-4F).

At block 260A, the system generates synthesized speech audio data that includes synthesized speech that incorporates the textual segment determined at block 254A and that is synthesized with the one or more prosodic properties determined at block 258A. In some implementations, generating the synthesized speech audio data includes synthesizing the synthesized speech applying a speaker embedding of the given user, the textual segment (or phonemes thereof), and the one or more prosodic properties as input across a speech synthesis model (e.g., speech synthesis model(s) 130A of FIG. 1). In some other implementations, generating the synthesized speech audio data includes synthesizing the synthesized speech applying a speaker embedding of the given user and the textual segment (or phonemes thereof) as input across a speech synthesis model (e.g., speech synthesis model(s) 130A of FIG. 1). In some further versions of those implementations, the one or more prosodic properties can be utilized in post-processing of the synthesized speech audio data to modify the synthesized speech audio data after it is generated such that the synthesized speech is synthesized with the one or more prosodic properties. In any of the implementations, the resulting synthesized speech audio data and the synthesized speech represents a synthesized voice that is specific and unique to the given user, and that can vary based on the prosodic properties determined at block 258A. It is noted that, in various implementations, block 258 can be omitted and block 260 can include generating synthesized speech that will have prosodic properties, but those prosodic properties will not be ones determined based on block 258 (e.g., they can be fixed).

At block 262A, the system causes the synthesized speech to be rendered via one or more speakers of the client device and/or an additional client device. By rendering the synthesized speech via one or more of the speakers of the client device and/or the additional client device, the synthesized speech is audibly perceptible to the additional participant(s) in the conversation. In implementations where the user interface input is spoken input of the given user, the synthesized speech can be rendered after the given user provides the spoken input. In some other implementations where the user interface input is spoken input of the given user, the synthesized speech can be rendered while the given user provides the spoken input. Further, in some implementations, a transcription of the synthesized speech can be transcribed and displayed on a user interface of the client device. In some versions of those implementations, the transcription of the synthesized speech can be selectable, and, when selected, the system causes the synthesized speech to be rendered again via one or more of the speakers of the client device and/or the additional client device, thus allowing the given user to repeat the synthesized speech without having to provide any additional spoken input.

At block 264A, like block 252B of FIG. 2B described above, the system monitors for voice activity of one or more other users at the client device (i.e. for voices other than the given user's voice). If, at an iteration of block 264A, the system does not detect any voice activity of other user(s) at the client device (e.g., including at least the additional participant(s) in the conversation), then the system can return to block 252A and continuously monitor for additional user interface input at the client device of the given user and/or voice activity of one or more other users at the client device in the manner described above. If, at an iteration of block 264A, the system detects voice activity of other user(s) at the client device, then the system can bypass block 252B, and proceed to block 254B.

Turning now to FIG. 2B, at block 254B, the system identifies additional participant(s) in the conversation. The system can identify the additional participant(s) in the conversation in the same manner described with respect to block 256A of FIG. 2A. Notably, and as described with respect to block 256A of FIG. 2A, the system can generate a speech embedding and/or visual embedding of the additional participant(s) in the conversation. In some implementations (e.g., as indicated by the dashed lines), if the other user(s) are not identified as additional participant(s) in the conversation, such as when the voice activity detected at block 264A of FIG. 2A or block 252B of FIG. 2B is ambient voice activity (e.g., voice activity detected at the client device, but not directed to the given user or from the given user and/or any other additional participant(s) in the conversation), then the system can return to block 252A of FIG. 2A or block 252B of FIG. 2B, and continuously monitor for additional user interface input at the client device of the given user and/or voice activity of one or more other users at the client device in the manner described above. In this manner, the system can identify false positives of voice activity that is detected, but not directed to the given user or part of the conversation between the user and the additional participant(s).

At block 256B, the system transcribes the voice activity of the other user(s), and displays the transcription on a user interface of the client device as a graphical indication of the voice activity, which graphical indication may include a semantic indication or identifier of the other user. In some implementations, the system transcribes the voice activity of the other user(s) only if the other user(s) are additional participant(s) in the conversation and/or if the other user(s) are known user(s) (e.g., as described herein with respect to block 258B of FIG. 2B). In some versions of those implementations, the client device of the given user provides an indication that voice activity is detected at the client device, and the transcription is presented responsive to receiving user input directed to the indication that the voice activity is detected at the client device (e.g., as described with respect to FIGS. 4E and 4F). In other implementations, the system transcribes the voice activity of the other user(s) even if the other user(s) are not known user(s).

At block 258B, the system determines whether the additional participant(s) in the conversation are known user(s). As described herein (e.g., with respect to blocks 256A of FIG. 2A and 254B of FIG. 2B), the system can generate a speaker embedding for a corresponding one of the additional participant(s) based on the voice activity detected at the given client device, and the system can generate a visual embedding of the corresponding one of the additional users in an image captured at the client device. In some implementations, the system can determine the additional participant(s) in the conversation are known user(s) by comparing the generated speaker embedding to a plurality of speaker embeddings stored locally on the client device of the given user (e.g., speaker embedding(s) database 112A of FIG. 1). The system can determine the generated speaker embedding matches a given one of the plurality of speaker embeddings if the generated speaker embedding is within a threshold distance, in embedding space, to the given one of the plurality of speaker embeddings. Based on determining the generated speaker embedding matches the given one of the plurality of speaker embeddings, the system can determine the voice activity originated from a corresponding additional participant in the conversation associated with the given one of the plurality of speaker embeddings. In some additional and/or alternative implementations, the system can determine the additional participant(s) in the conversation are known user(s) by comparing the generated visual embedding to a plurality of visual embeddings stored locally on the client device of the given user. The system can determine the generated visual embedding matches a given one of the plurality of visual embeddings if the generated visual embedding, or features thereof, match the given one of the plurality of visual embeddings (e.g., as determined using one or more image processing techniques). Based on determining the generated visual embedding matches the given one of the plurality of visual embeddings, the system can determine the voice activity originated from a corresponding additional participant in the conversation associated with the given one of the plurality of visual embeddings.

If, at an iteration of block 258B, the system determines that a given one of the additional participant(s) are not known users, then the system can proceed to block 260B. At block 260B, the system prompts the given one of the additional participant(s) for authorization to store the generated speech embedding and/or the generated visual embedding generated. In some implementations, the prompt can be rendered visually and/or audibly at the client device of the given user, and the given one of the additional participant(s) can provide spoken or touch input to authorize the storing of the speech embedding and/or the visual embedding locally at the client device. In other implementations, the prompt can be rendered at additional client device(s) of the given one of the additional participant(s). In some versions of those implementations, the prompt can be rendered at the additional client device(s) responsive to transmitting of the prompt from the client device of the given user to the additional client device(s) of the given one of the additional participant(s) via one or more networks (e.g., local area networks, wide area networks, Bluetooth, near-field communication, and/or other networks) as a pop-up notification, a text message, an SMS message, and/or other communication channels.

At block 262B, the system determines whether the additional participant(s) provided authorization responsive to the prompt rendered at block 260B. If, at an iteration of block 262B, the system determines that the additional participant(s) provided authorization, then the system can proceed to block 264B. At block 264B, the system can store the generated speech embedding and/or the generated visual embedding locally on the client device of the given user in association with the additional participant(s). The speech embedding and/or the visual embedding of the additional participant(s) can be utilized in recognizing the additional participant(s) in future conversations with the given user. If, at an iteration of block 262B, the system determines that the additional participant(s) did not provide authorization, then the system can proceed to block 266B. At block 266B, the system can discard the generated speech embedding and/or the generated visual embedding. From both blocks 264B and 266B, the system can proceed to block 268B. Further, if, at an iteration of block 258B, the system determines that the additional participant(s) are known user(s) based on identifying a matching speech embedding and/or a matching visual embedding, then the system can also proceed to block 268B.

At block 268B, the system determines, based on additional user interface input at the client device of the given user, a textual segment for conveying or providing in a conversation. The system can determine the textual segment for conveying in a conversation in the same manner described with respect to block 254A of FIG. 2A. Notably, the textual segment for conveying in the conversation at block 268B is responsive to the voice activity of the additional participant(s) detected at block 264A of FIG. 2A or block 252B of FIG. 2B, and, more particularly, responsive to additional spoken user input included in the voice activity. At block 270B, the system determines one or more prosodic properties. The system can determine one or more of the prosodic properties in the same manner described with respect to block 258A of FIG. 2A. At block 272B, the system generates synthesized speech audio data that includes synthesized speech that incorporates the textual segment and that is synthesized with the prosodic properties. The system can generate the synthesized speech audio data that includes the synthesized speech in the same manner described with respect to block 260A of FIG. 2A. At block 274B of FIG. 2, the system causes the synthesized speech to be rendered via one or more speakers of the client device and/or an additional client device. The system can cause the synthesized speech to be rendered in the same manner described with respect to block 262A of FIG. 2A.

At block 276B, like block 252A of FIG. 2A described above, the system monitors for further user interface input of the given user at the client device of the given user. If, at an iteration of block 276B, the system does not detect any further user interface input of the given user at the client device of the given user, then the system can return to block 252B and continuously monitor for additional user interface input at the client device of the given user and/or voice activity of one or more other users at the client device in the manner described above. If, at an iteration of block 276B, the system detects further user interface input of the given user at the client device of the given user, then the system can bypass block 252A, and proceed to block 254A.

Accordingly, methods 200A and 200B allow the given user to dynamically use speech assistance in a conversation with one or more additional participants. Further, synthesized speech generated using the speech assistance of methods 200A and 200B can be tailored, for the given user, to the additional participant(s) in the conversation by determining one or more prosodic properties based on a relationship between the given user and the additional participant(s) in the conversation, and/or based on classification(s) of a location of the client device of the given user. Thus, the synthesized speech can be specific and unique to the given user, and adapted for different additional participant(s) in the conversation and/or different environments of the conversation.

Figure 3:
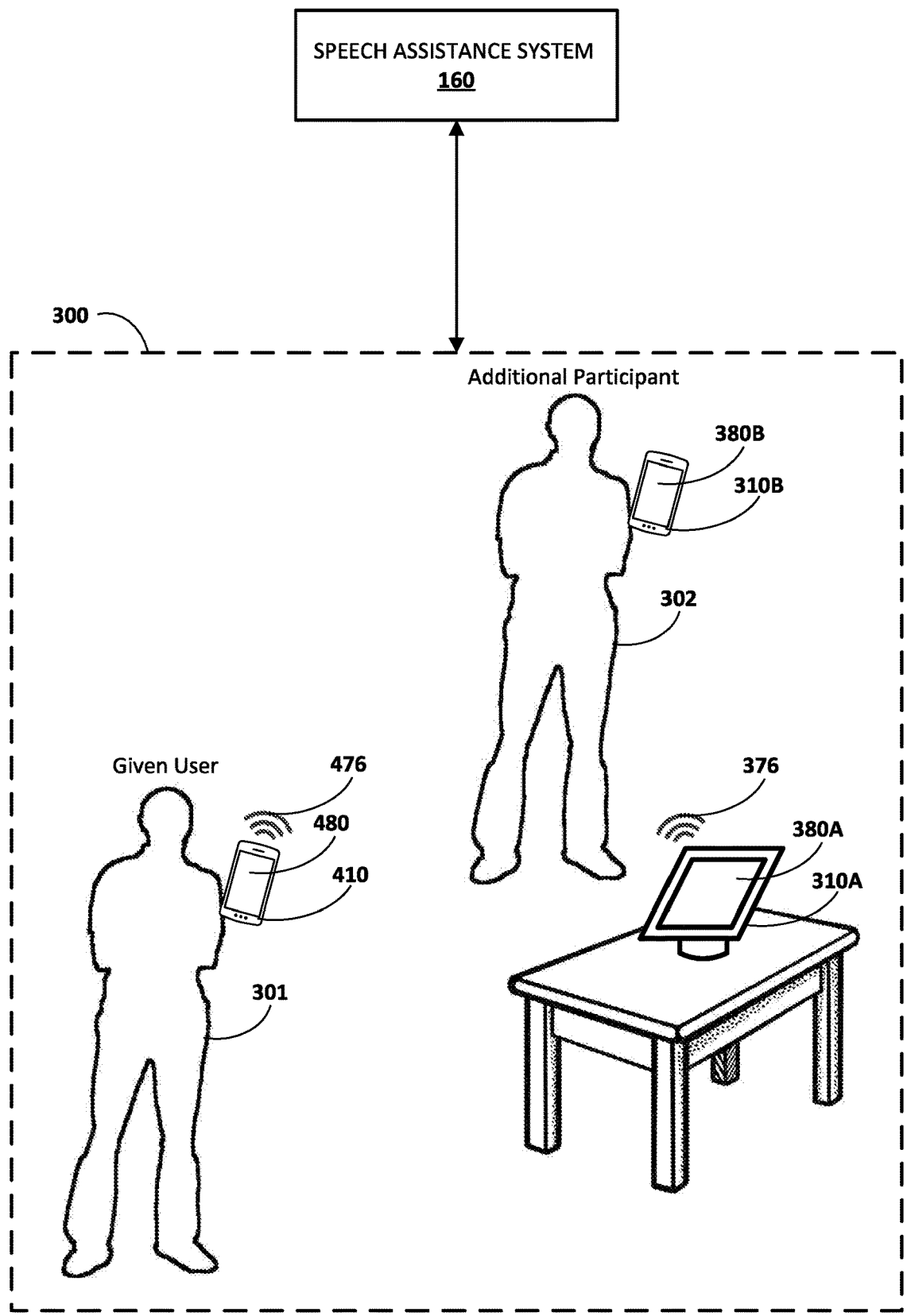
FIG. 3 depicts a scenario in an example environment that demonstrates various aspects of the present disclosure, in accordance with various implementations.

FIG. 3 depicts a scenario in an example environment 300 that demonstrates various aspects of the present disclosure, in accordance with various implementations. The environment 300 includes a given user 301 engaging in a conversation with an additional participant 302. Although the given user 301 and the additional participant 302 are depicted as both being present in the environment 300, it should be understood that is for ease in explanation only and is not meant to be limiting. For example, the given user 301 may be present in the environment of FIG. 3, and the additional participant 302 in the conversation may be located in a remote environment that is locationally distinct from the environment 300 of FIG. 3. In this example, the given user 301 may be engaging in the conversation with the additional participant 302 via a telephone call, a VoIP call, a video chat, and/or other forms of remote communication that include transmission of audio data. Notably, in implementations where the additional participant 302 is located in an environment that is locationally distinct from the given user 301 in the environment 300 of FIG. 3, the speech assistance system 160 can still facilitate the conversation between the given user 301 and the additional participant 302 in the conversation.

As described in more detail herein (e.g., with respect to FIGS. 4A-4F), the given user 301 can utilize computing device 310A and/or client device 410 of the given user 301 to interact with speech assistance system 160. In some implementations, the speech assistance system 160 can be executed locally on the computing device 310A and/or the client device 410 of the given user 301 to facilitate the conversation between the given user 301 and the additional participant 302 in the conversation. In other implementations, the speech assistance system 160 can be executed remotely at one or more servers, and data can be transmitted by the computing device 310A and/or the client device 410 of the given user 301 to one or more of the servers over network(s) (e.g., network(s) 190 of FIG. 1), and/or can be received at the computing device 310A and/or the client device 410 of the given user 301 from one or more of the servers over the network(s). In some versions of those implementations, the data that is transmitted and/or received over the network(s) can include, for example, a textual segment to be included in synthesized speech, a speaker embedding for the given user 301, one or more prosodic properties for the synthesized speech, synthesized speech audio data, and/or other data.

The speech assistance system 160 can generate synthesized speech audio data that includes synthesized speech representing speech of the given user 301, and the synthesized speech can be rendered audibly by the computing device 310A as indicated by sound waves 376 and/or by the client device 410 of the given user 301 as indicated by sound waves 476, and/or visually on a user interface 380A of the computing device 310A and/or a user interface 480 of the client device 410 of the given user 301. The synthesized speech can include a textual segment determined based on user interface input detected at the computing device 310A and/or detected at the client device 410 of the given user 301. Further, the synthesized speech can be generated using a speaker embedding of the given user 301 that is stored locally on the computing device 310A and/or the client device 410 of the given user 301, and can be synthesized with one or more prosodic properties determined by the speech assistance system 160. As described in more detail herein (e.g., with respect to FIGS. 4A-4F), the one or more prosodic properties can be determined based on a classification of a location of the environment 300, at least one attribute of a relationship between the given user 301 and the additional participant 302 in the conversation, and/or semantics of the conversation between the given user 301 and the additional participant 302 in the conversation. Accordingly, the synthesized speech is unique to the given user 301 based on the speaker embedding of the given user 301, and the one or more prosodic properties vary based on the classification of the location of the environment 300, the relationship between the given user 301 and the additional participant 302 in the conversation, and the semantics of the conversation between the given user 301 and the additional participant 302 in the conversation. The techniques described herein can be advantageous when the given user 301 is a speech-impaired user.

Referring to FIGS. 4A-4F, various non-limiting examples of user interfaces utilized in establishing a speech embedding for a given user, and generating synthesized speech that is synthesized with one or more prosodic properties, in accordance with various implementations. The client device 410 of the given user 301 of FIG. 3 is depicted and includes the user interface 480. Although the techniques of FIGS. 4A-4F are depicted as being implemented by the client device 410 of the given user 301 of FIG. 3, it should be understood that this for ease in explanation only and is not meant to be limiting. For example, the techniques of FIGS. 4A-4F can additionally and/or alternatively be implemented by one or more other devices (e.g., computing device 310A of FIG. 3, computing device 510 of FIG. 5, computing devices of other users, and/or other computing devices). The user interface 480 of the client device 410 includes various system interface elements 491, 492, and 493 (e.g., hardware and/or software interface elements) that may be interacted with by the given user 301 to cause the client device 410 to perform one or more actions. Further, the user interface 480 of the client device 410 enables the given user 301 to interact with content rendered on the user interface 480 by touch input (e.g., by directing user input to the user interface 480 or portions thereof) and/or by spoken input (e.g., by selecting microphone interface element 494—or just by speaking without necessarily selecting the microphone interface element 494 (i.e., an automated assistant executing at least in part on the client device 410 may monitor for one or more terms or phrases, gesture(s), gaze(s), mouth movement(s), lip movement(s), and/or other conditions to activate spoken input) at the client device 410).

Figure 4A:
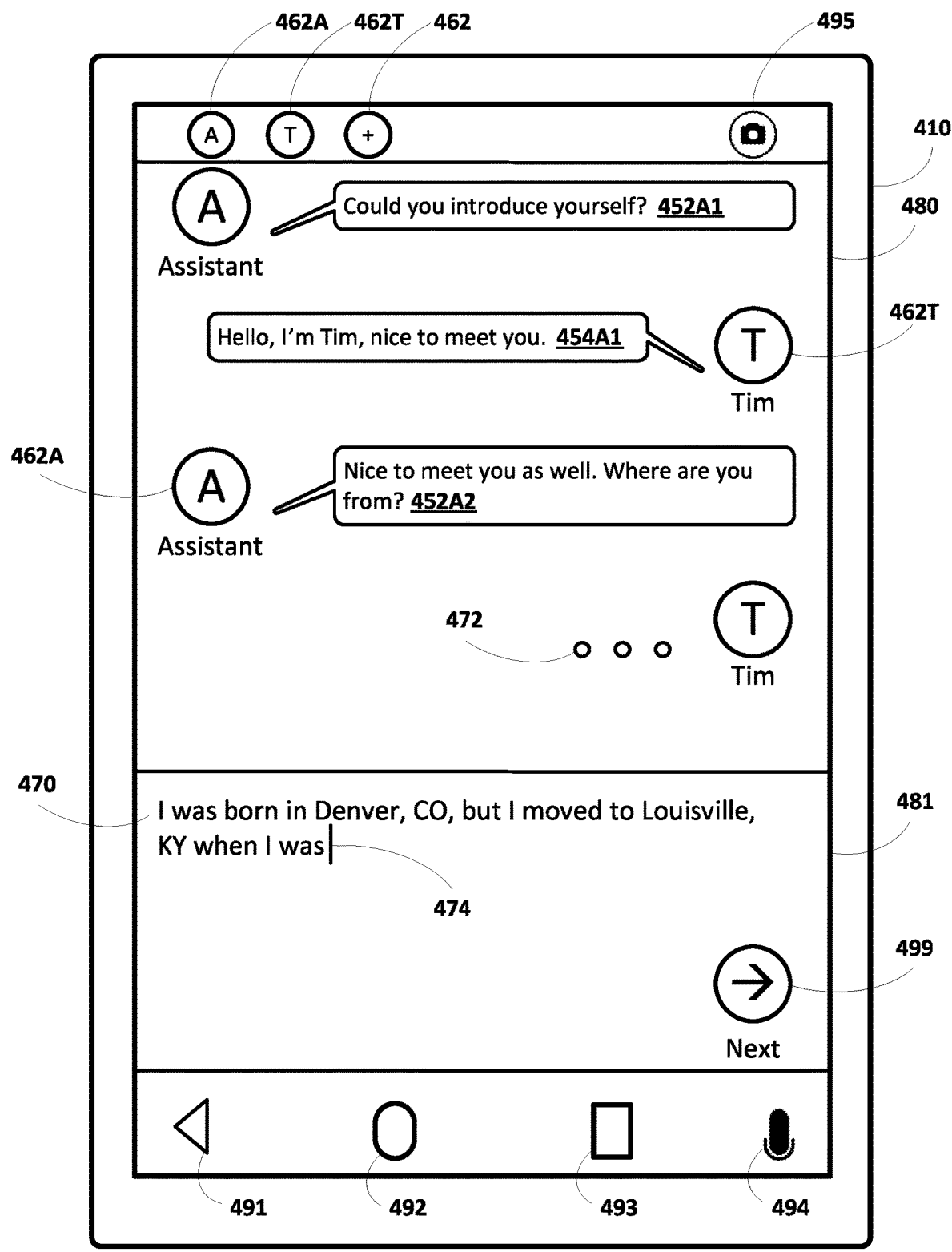
FIGS. 4A, 4B, 4C, 4D, 4E, and 4F depict various non-limiting examples of user interfaces utilized in establishing a speech embedding for a given user, and generating synthesized speech that is synthesized with one or more prosodic properties, in accordance with various implementations.

In some implementations, the user interface 480 of the client device 410 can include graphical elements identifying each of the participants in the conversation. The participants in the conversation can be identified in various manners, such as any manner described herein (e.g., speaker embedding(s), visual embeddings(s), body pose and/or head pose, and/or other manners). As depicted throughout FIGS. 4A-4F, graphical element 462A corresponds to the automated assistant, graphical element 462T corresponds to Tim, graphical element 462R corresponds to Randy, graphical element 462J corresponds to Jim, graphical element 462U corresponds to an unknown user, and graphical element 462S corresponds to Stan. In some versions of those implementations, these graphical elements that identify participants in the conversation can be visually rendered along with corresponding prompts from the automated assistant (e.g., as depicted in FIGS. 4A), and/or transcriptions of user interface input from the given user 301 of the client device 410 and transcriptions of additional user spoken input of additional participants in the conversation (e.g., as depicted in FIGS. 4B-4F). In some additional and/or alternative versions of those implementations, these graphical elements that identify participants in the conversation can be visually rendered at a top portion of the user interface 480 of the client device 410. Although these graphical elements are depicted as being visually rendered at the top portion of the user interface 480 of the client device 410, it should be noted that is not meant to be limiting, and that these graphical elements can be rendered on a side portion of the user interface 480 or a bottom portion of the user interface 480. Moreover, in some versions of those additional and/or alternative implementations, graphical element 462 can be also be rendered at the top portion of the user interface 480 along with these graphical elements that identify the participants of the conversation. The graphical element 462 can, when selected, enable the given user 301 of the client device 410 to add additional participants to the conversation. For example, when the graphical element 462 is selected, a list of contacts of the given user 301 can be rendered on the user interface 480 and one or more of the contacts can be added to the conversation, a list of known users can be rendered on the user interface 480 and one or more of the known users can be added to the conversation, and and/or other techniques for manually adding additional participants to the conversation.

Referring initially to FIG. 4A, a speaker embedding for the given user 301 of the client device 410 can be established. In some implementations, the speaker embedding for the given user 301 can be generated as described herein (e.g., with respect to identification engine 112 of FIG. 1), and can be utilized in generating synthesized speech that represents speech of the given user 301. In some versions of those implementations, an automated assistant executing at least in part on the client device 410 can cause a plurality of prompts to be rendered audibly via speaker(s) of the client device 410 and/or of an additional computing device (e.g., computing device 310A of FIG. 3) and/or visually via the user interface 480 of the client device 410. The plurality of prompts can be part of a conversation between the given user 301 and the automated assistant, and each of the prompts can solicit spoken input from the given user 301 of the client device 410. Further, the spoken input from the given user 301 that is responsive to each of the prompts can be detected via one or more microphones of the client device 410. In some implementations, the given user 301 can cycle through each of the prompts by directing user interface input to graphical element 499 that, when selected, causes the automated assistant to render a subsequent prompt. In some implementations, the automated assistant can continuously cause the prompts to be rendered at the client device 410 until the speaker embedding for the given user 301 of the client device 410 is established. In some other implementations, the automated assistant can continuously cause the prompts to be rendered at the client device 410 until a threshold number of prompts have been rendered.

For example, the automated assistant can cause a prompt 452A1 of "Could you introduce yourself?" to be rendered at the client device 410, and the client device can detect spoken input 454A1 from the given user 301 of "Hello, I'm Tim, nice to meet you" responsive to rendering of the prompt 452A1. For the sake of simplicity, the given user 301 of the client device 410 is often referred to as "Tim" throughout FIGS. 4A-4F. Further, the automated assistant can cause another prompt 452A2 of "Nice to meet you as well. Where are you from?" to be rendered at the client device 410. As the client device 410 detects further spoken input from Tim, a transcription 470 of the further spoken input of "I was born in Denver, CO, but I moved to Louisville, KY when I was . . . " can be displayed by the client device 410. Notably, the transcription 470 of the further spoken input is incomplete (e.g., as indicated by ellipses 472 and cursor 474), and Tim may be edit any portion of the transcription 470 by providing touch input and/or spoken input directed to the textual segment user interface 481 prior to any indication that the further spoken input is complete (e.g., end-pointing and/or other techniques for detecting completion of spoken input). The automated assistant can cause further prompts to be rendered at the client device 410 until the speaker embedding for Tim is established. For example, the automated assistant can further cause a joke to be rendered by the client device 410, and Tim's laugh responsive to the joke can be incorporated into Tim's speech embedding.

Moreover, in some implementations, the automated assistant can render a plurality of representations corresponding to candidate speaker embeddings on the user interface 480 of the client device 410, the given user can listen to synthesized speech associated with each of the candidate speaker embeddings, and the client device 410 can receive a selection of a given one of the candidate speaker embeddings. The selected candidate speaker embedding can then be stored associated with a given user of the client device 110, can be used in generating synthesized speech that represents speech of the given user of the client device. For example, assume the client device 410 renders a first representation associated with a deep male voice, a second representation associated with a male voice having a southern accent, and a third representation associated with a male voice having a Midwestern accent. Further assume that Tim listens to synthesized speech associated with each of the representations, and selects the third representation. The speaker embedding associated with the third representation can then be stored in association with Tim, and used in generating synthesized speech that represents speech Tim's speech. Accordingly, in those implementations Tim can specify, through user interface input(s), a desired voice for speech synthesis on behalf of Tim, where the desired voice does not conform to Tim's actual voice. In some additional and/or alternative implementations, the automated assistant can determine a speaker embedding for a given user of the client device 410 based on the user interface 480 of the client device 410 responsive to the prompts. The automated assistant can render, via the user interface 480 of the client device 410, an additional prompt that solicits confirmation of the determined speaker embedding, the determined speaker embedding can be stored in association with the given user of the client device 410, and can be used in generating synthesized speech that represents speech of the given user of the client device 410. For example, based on the transcription 470 indicating that Tim currently lives in the Midwest (e.g., Louisville, KY), the automated assistant can determine that a speaker embedding associated with a Midwest accent should be assigned to Tim, and can prompt Tim to confirm the speaker embedding associated with the Midwest accent. In response to receiving confirmation for Tim, the speaker embedding can be stored in association with Tim. Moreover, prior to the speaker embedding being stored, the given user of the client device 410 can edit the speaker embedding by moving the speaker around in embedding space to generate various modifications of the speaker embedding. By establishing Tim's speaker embedding, the client device 410 can model Tim's voice by generating synthesized speech that represents Tim's speech based on Tim's speaker embedding.

As described herein, the synthesized speech can be synthesized with the one or more prosodic properties. For example, and with respect to FIG. 4B, assume that the additional participant 302 of FIG. 3 is Randy, that Randy is Tim's boss (e.g., determined using relationship engine 141 of FIG. 1 and/or based on attribute(s) stored in relationship attribute(s) database of FIG. 1), and that the environment 300 is classified as a work environment (e.g., determined using environment engine 142 based on sensor data, such as GPS sensor data, of the client device 410 indicating Tim is at a location associated with his work). Further assume that the client device 410 determines a textual segment 452B1 of "How was the meeting today?" corresponding to additional user spoken input detected at the client device 410, and renders the textual segment 452B1 via the user interface 480. In some implementations, the client device 410 can determine the additional user spoken input corresponding to the textual segment 452B1 originated from Randy by generating a speaker embedding based on the additional user spoken input, and identifying a matching speaker embedding associated with Randy by comparing the generated speaker embedding to a plurality of speaker embeddings stored locally on the client device 410 (e.g., speech embedding(s) database 112A of FIG. 1). In some additional and/or alternative implementations, the client device can determine Randy is the additional participant in the conversation by capturing an image that includes Randy, using one or more vision sensors of the client device 410, and that is captured responsive to user interface input directed to graphical element 495. The client device 410 can process the image to generate a visual embedding associated with Randy, and identify a matching visual embedding associated with Randy by comparing the generated visual embedding to a plurality of visual embeddings stored locally on the client device 410 (e.g., visual embedding(s) database 112B of FIG. 1).

Further, the client device 410 can detect user interface input of "It went very well, we are back on track to finish the project by the 17th" from Tim. Assuming the user interface input is spoken input from Tim, the client device 410 can process the user interface input, using or more speech recognition model(s) (e.g., speech recognition model(s) 120A of FIG. 1) to determine a textual segment 454B1A of "It went very well, we are back on track to finish the project by the 17th" corresponding to the user interface input from Tim. Moreover, the client device 410 can determine a first set of prosodic properties 454B1B based on the additional participant being Randy (e.g., Tim's boss), the environment of the conversation between Tim and Randy being classified as a work environment, and based on the semantics of the conversation (e.g., Tim's boss inquiring about a work meeting). Accordingly, the client device 410 can generate and audibly render (e.g., as indicated by sound waves 476 and using speaker(s) of the client device 410 and/or of an additional computing device (e.g., computing device 310A of FIG. 3)) synthesized speech, that includes the textual segment 454B1A and that is synthesized with the first set of prosodic properties 454B1B, in response to receiving the user interface input from Tim at the client device 410. Further, user interface input directed to the textual segment 454B1A may cause the synthesized speech to be audibly rendered again without the need for Tim to provide any additional spoken input.

Figure 4B:
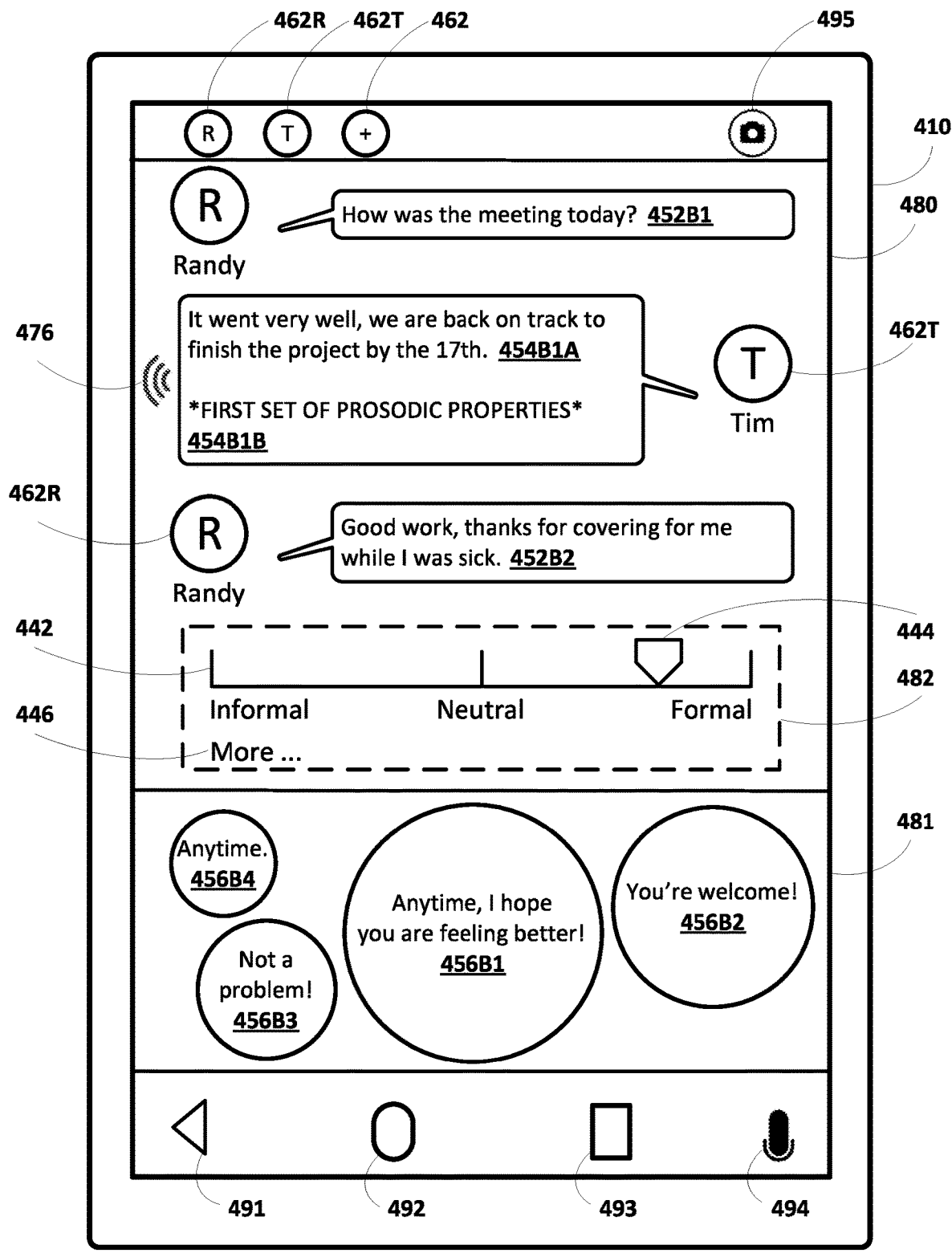
Figure 4C:
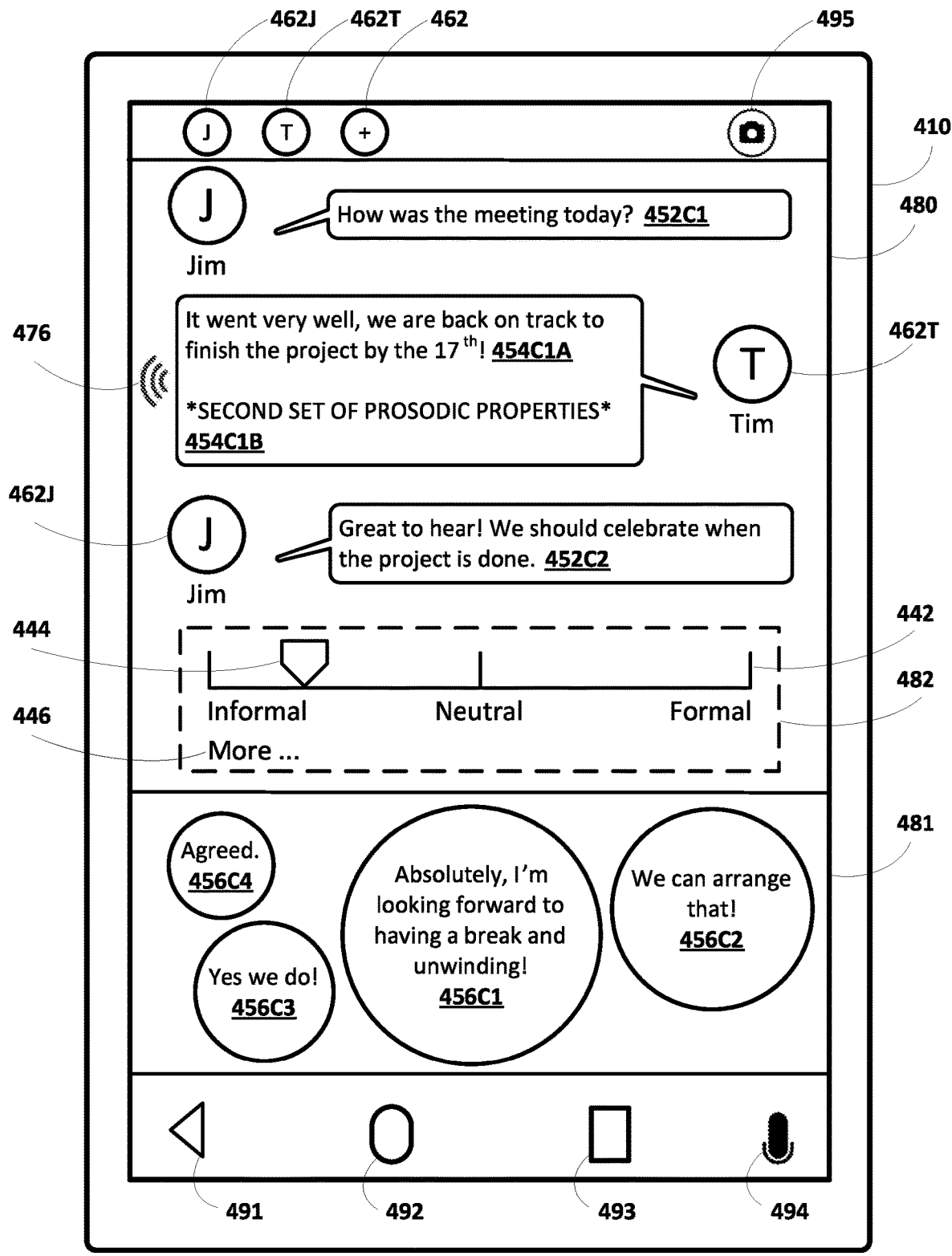

In contrast, and with respect to FIG. 4C, assume that the additional participant 302 of FIG. 3 is Jim, that Jim is Tim's friend (e.g., determined using relationship engine 141 of FIG. 1 and/or based on attribute(s) stored in relationship attribute(s) database of FIG. 1), and that the environment 300 is classified as a home environment (e.g., determined using environment engine 142 based on sensor data, such as GPS sensor data, of the client device 410 indicating Tim is at a location associated with his home). Further assume that the client device 410 determines a textual segment 452C1 of "How was the meeting today?" corresponding to additional user spoken input detected at the client device 410, and renders the textual segment 452C1 via the user interface 480. In some implementations, the client device 410 can determine the additional user spoken input corresponding to the textual segment 452C1 originated from Jim by generating a speaker embedding based on the additional user spoken input, and identifying a matching speaker embedding associated with Jim by comparing the generated speaker embedding to a plurality of speaker embeddings stored locally on the client device 410 (e.g., speech embedding(s) database 112A of FIG. 1). In some additional and/or alternative implementations, the client device can determine Jim is the additional participant in the conversation by capturing an image that includes Jim, using one or more vision sensors of the client device 410, and that is captured responsive to user interface input directed to graphical element 495. The client device 410 can process the image to generate a visual embedding associated with Jim, and identify a matching visual embedding associated with Jim by comparing the generated visual embedding to a plurality of visual embeddings stored locally on the client device 410 (e.g., visual embedding(s) database 112B of FIG. 1).

Further, the client device 410 can detect user interface input of "It went very well, we are back on track to finish the project by the 17th" from Tim. Assuming the user interface input is spoken input, the client device 410 can process the user interface input, using or more speech recognition model(s) (e.g., speech recognition model(s) 120A of FIG. 1) to determine a textual segment 454C1A of "It went very well, we are back on track to finish the project by the 17th" corresponding to the user interface input from Tim. Moreover, the client device 410 can determine a second set of prosodic properties 454C1B based on the additional participant being Jim (e.g., Tim's friend), the environment of the conversation between Tim and Jim being classified as a home environment, and based on the semantics of the conversation (e.g., Tim's friend inquiring about a work meeting). Accordingly, the client device 410 can generate synthesized speech audio data (e.g., using speech synthesis model(s) 130A of FIG. 1), based on Tim's speech embedding established in FIG. 4A, that includes the textual segment 454C1A, and that is synthesized with the second set of prosodic properties 454C1B. The client device 410 can audibly render (e.g., as indicated by sound waves 476 and using speaker(s) of the client device 410 and/or of an additional computing device (e.g., computing device 310A of FIG. 3)) synthesized speech included in the synthesized speech audio data in response to receiving the user interface input at the client device 410. Further, user interface input directed to the textual segment 454C1A may cause the synthesized speech to be audibly rendered again without the need for Tim to provide any additional spoken input.

Notably, the additional user spoken input corresponding to the textual segment 452B1 from Randy and the additional user spoken input corresponding to the textual segment 452C1 from Jim both inquire "How was the meeting today?", and the textual segments 454B1A and 454C1A based on the user interface input from Tim are the same. However, the synthesized speech in FIGS. 4B and 4C is generated using different sets of prosodic properties (e.g., the first set of prosodic properties in FIG. 4B, and the second set of prosodic properties in FIG. 4C). This difference in prosodic properties can be based on the different relationships (e.g., boss vs. friend), the different environments (e.g., work environment vs. home environment), and/or the semantics of the conversation (e.g., a boss asking a question vs. a friend asking a question), and this difference indicates that at least one prosodic property in the first set of prosodic properties 454B1B differs from the second set of prosodic properties 454C1B. For example, the first set of prosodic properties of FIG. 4B may include a monotonous tone, little emotion, consistent rhythm, and/or other prosodic properties to reflect more professional speech when Tim is speaking with his boss Randy (e.g., as also indicated by textual segment 454B1B ending in a period). In contrast, the second set of prosodic properties of FIG. 4C may include an excited tone, more emotion, a varying rhythm, and/or other prosodic properties to reflect more casual speech when Tim is speaking with his friend Jim (e.g., as also indicated by textual segment 454C1B ending in an exclamation point).

Figure 4D:
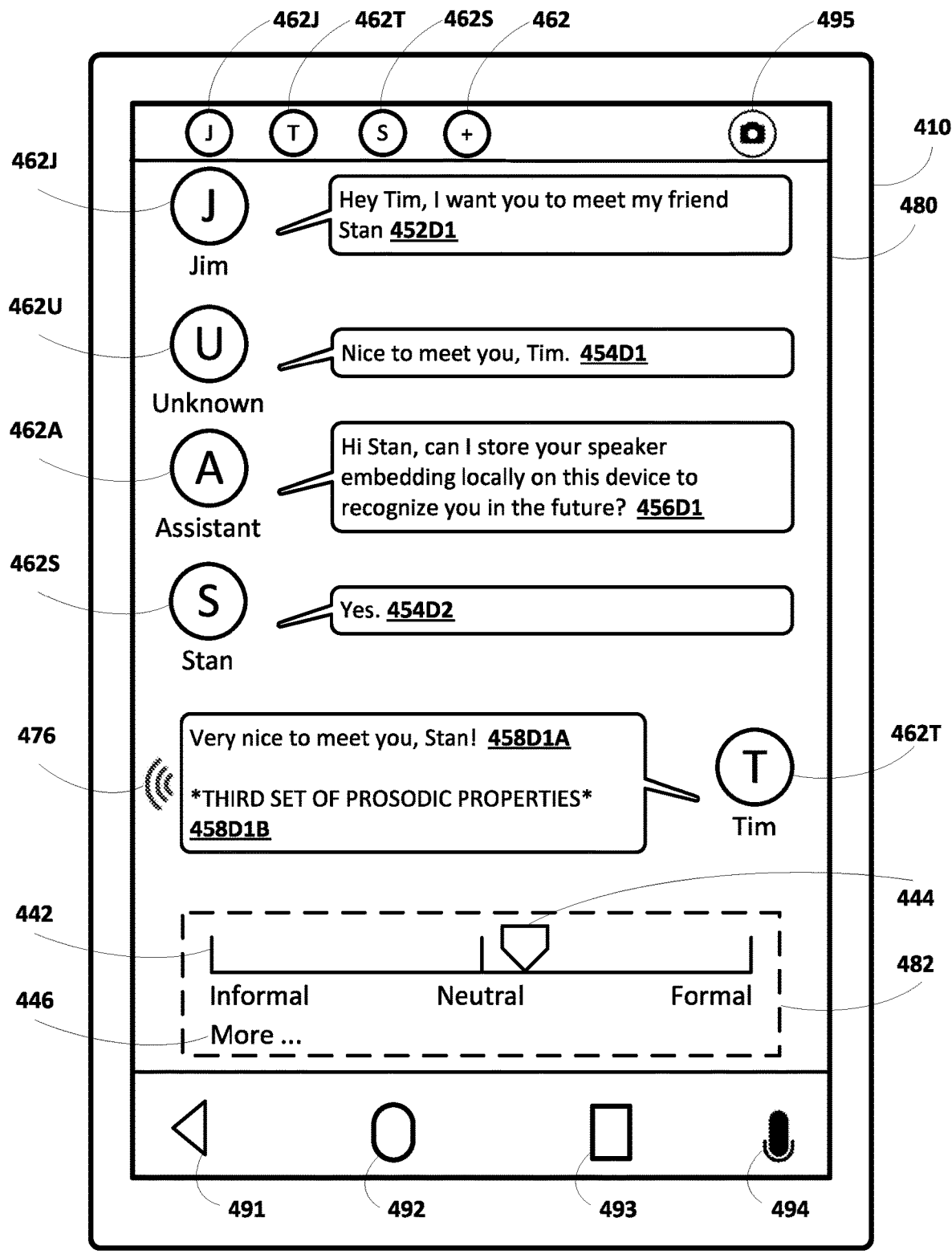

In some implementations, a prosodic properties user interface 482 can optionally be visually rendered via the user interface 480 of the client device 410 (e.g., as indicated in FIGS. 4B-4D as dashed lines) when the additional user spoken input is detected at the client device 410. In other implementations, the prosodic properties user interface 482 can be visually rendered via the user interface 480 of the client device 410 in response to detecting user interface input (e.g., touch input or spoken input) directed to the graphical elements 462R and 462J, respectively in FIGS. 4B and 4C. The prosodic properties user interface 482 can include, for example, a scale 442 having an indicator 444 that indicates how "informal," "neutral," or "formal" any synthesized speech generated by the client device 410 is with respect to the additional participant. For example, the indicator 444 in FIG. 4B indicates that any synthesized speech generated by the client device 410 that is directed to Randy will be more formal. In contrast, the indicator 444 in FIG. 4C indicates that any synthesized speech generated by the client device 410 that is directed to Jim will be more informal. In some versions of those implementations, the indicator 444 may be slidable along the scale 442 in response to user interface input directed to the indicator 444. When the indicator 444 is adjusted along the scale 442, at least one prosodic property in the set of prosodic properties is adjusted to reflect the adjustment. For example, if the indicator 444 is adjusted on the scale 442 to reflect more informal speech, then any synthesized speech subsequently generated by the client device 410 that is directed to Randy include a more excited tone (as compared to a monotonous tone), but still not include as much emotion as the synthesized speech generated by the client device 410 that is directed to Jim. Thus, the indicator 444 can be adjusted on the scale 442 to modify at least prosodic property in a set of prosodic properties with respect to a given additional participant in the conversation. Although FIGS. 4B-4D are depicted as having the scale 442 and the indicator 444 that indicates how "informal," "neutral," or "formal" any synthesized speech generated by the client device 410, it should be understood that is for ease in explanation only and is not meant to be limiting. For example, the scale 442 and the indicator 444 can indicate how "professional" or "casual" the synthesized speech will be, how "friendly" or "hostile" the synthesized speech will be, and so on.

Moreover, in some versions of those implementations, the prosodic properties user interface 482 can include a "More . . . " selectable element 446 that, when selected, causes a plurality of prosodic properties to be rendered on the prosodic properties user interface 482. The prosodic properties can rendered along with corresponding scales and indicators (e.g., like scale 442 and indicator 444), fields for entering values for each of the prosodic properties, fields for enabling or disabling certain prosodic properties, and/or other techniques for allowing the prosodic properties to be individually adjusted. For example, when the "More . . . " selectable element 446 is selected, an indication for each of "intonation," "tone," "stress," "rhythm," "tempo," "pitch," "pause," and/or other prosodic properties, and a corresponding scale and indicator can be visually rendered on the client device 410 via the prosodic properties user interface 482. As another example, when the "More . . . " selectable element 446 is selected, an indication for each of "intonation," "tone," "stress," "rhythm," "tempo," "pitch," "pause," and/or other prosodic properties, and a corresponding field for each of the prosodic properties that allows for the corresponding prosodic property to be enables of disables can visually rendered on the client device 410 via the prosodic properties user interface 482.

Referring specifically to FIG. 4B, further assume the client device determines a textual segment 452B2 of "Good work, thanks for covering for me while I was sick" corresponding to further additional user spoken input from Randy, and renders the textual segment 452B2 via the user interface 480. As described herein, in some implementations, suggestions(s) that are responsive to spoken input of additional participant(s) detected at the client device 410 may only be rendered responsive to determining a given user of the client device 410 is an intended target of the spoken input. In some implementations, the client device 410 can generate one or more suggestions 456B1-456B4 that each include a corresponding candidate textual segment that is responsive to the further additional user spoken input from Randy. The one or more suggestions 456B1-456B4 can be visually rendered on the client device 410 via the textual segment user interface 481. The client device 410 can generate the one or more suggestions using an automatic suggestion engine as described in more detail herein (e.g., with respect to automatic suggestion engine 150 of FIG. 1). In some versions of those implementations, one or more of the suggestions 456B1-456B4 can be visually rendered more prominently than the other suggestions 456B1-456B4. A given one of the suggestions 456B1-456B4 can be rendered more prominently based on a ranking of the suggestions 456B1-456B4, where the ranking can be determined by an automatic suggestion engine (e.g., automatic suggestion engine 150 of FIG. 1). For example, the suggestions 456B1-456B4 in FIG. 4B are depicted as bubbles, and a first suggestion 456B1 is depicted as the largest bubble, a second suggestion 456B2 is depicted as the second largest bubble, and so on. Upon receiving further user interface input at the client device 410 directed to one of suggestions 456B1-456B4, the client device 410 can generate synthesized speech, using Tim's speech embedding established in FIG. 4A, that includes the candidate textual segment of the selected suggestion, and that is synthesized with a set of prosodic properties. Notably, the set of prosodic properties used in generating the synthesized speech responsive to the further additional user spoken input can vary from the first set of prosodic properties 454B1B. For example, the set of prosodic properties can include more emotion and more emphasis than the first set of prosodic properties 454B1B to reflect Tim's sympathy for Randy recovering from an illness. Thus, the prosodic properties can also vary within a given conversation even though the additional participant (e.g., Randy) and the environment (e.g., work environment) remain the same. It should be noted that further spoken input in addition to or in lieu of a selection of one of the suggestions 456B1-456B4, and that the suggestions 456B1-456B4 are provided for ease in explanation only and is not meant to be limiting.

Referring specifically to FIG. 4C, further assume the client device 410 determines a textual segment 452C2 of "Great to hear! We should celebrate when the project is done" corresponding to further additional user spoken input from Jim, and renders the textual segment 452C2 via the user interface 480. As described herein, in some implementations, suggestions(s) that are responsive to spoken input of additional participant(s) detected at the client device 410 may only be rendered responsive to determining a given user of the client device 410 is an intended target of the spoken input. In some implementations, the client device 410 can generate one or more suggestions 456C1-456C4 that each include a corresponding candidate textual segment that is responsive to the further additional user spoken input from Jim. The one or more suggestions 456C1-456C4 can be visually rendered on the client device 410 via the textual segment user interface 481. The client device 410 can generate the one or more suggestions using an automatic suggestion engine as described in more detail herein (e.g., with respect to automatic suggestion engine 150 of FIG. 1). In some versions of those implementations, one or more of the suggestions 456C1-456C4 can be visually rendered more prominently than the other suggestions 456C1-456C4. A given one of the suggestions 456C1-456C4 can be rendered more prominently based on a ranking of the suggestions 456C1-456C4, where the ranking can be determined by an automatic suggestion engine (e.g., automatic suggestion engine 150 of FIG. 1). For example, the suggestions 456C1-456C4 in FIG. 4C are depicted as bubbles, and a first suggestion 456C1 is depicted as the largest bubble, a second suggestion 456C2 is depicted as the second largest bubble, and so on. Upon receiving further user interface input at the client device 410 directed to one of suggestions 456C1-456C4, the client device 410 can generate synthesized speech, using Tim's speech embedding established in FIG. 4A, that includes the candidate textual segment of the selected suggestion, and that is synthesized with a set of prosodic properties. Notably, the set of prosodic properties used in generating the synthesized speech responsive to the further additional user spoken input can vary from the second set of prosodic properties 454C1B. For example, the set of prosodic properties can include more emphasis and more loudness than the second set of prosodic properties 454C1B to reflect Tim's excitement for finishing the project and desire to spend time with his friend Jim. Thus, the prosodic properties can also vary within a given conversation even though the additional participant (e.g., Jim) and the environment (e.g., home environment) remain the same. It should be noted that further spoken input in addition to or in lieu of a selection of one of the suggestions 456C1-456C4, and that the suggestions 456C1-456C4 are provided for ease in explanation only and not meant to be limiting.

Turning now to FIG. 4D, additional user spoken input of an unknown user is detected at the client device 410, and the unknown user is prompted for authorization to store a speaker embedding and/or visual embedding for the unknown user. By storing the speaker embedding and/or visual embedding of the unknown user, the unknown user can become and known user and recognized in the future when voice activity that matches the speaker embedding is detected at the client device 410 and/or when a visual embedding that matches the visual embedding is captured in an image at the client device 410. In some implementations, an automated assistant can prompt the unknown user for authorization to store a corresponding voice embedding and/or visual embedding at the client device 410 (e.g., as described with respect to FIG. 2B). In some additional and/or alternative implementations, the automated assistant can prompt the unknown user for authorization to store a corresponding voice embedding and/or visual embedding at an additional client device. In some versions of those implementations, the prompt can be transmitted from the client device 410 to the additional client device over network(s) (e.g., network(s) 190 of FIG. 1), and rendered on a user interface of the additional client device (e.g., via user interface 380B of additional client device 310B of the additional participant 302 in FIG. 3). The client device 410 can receive, responsive to the prompt, input (e.g., touch input or spoken input) from the unknown user indicating whether or not the speaker embedding and/or the visual embedding can be stored locally on the client device 410. If the client device receives input indicating the speaker embedding and/or the visual embedding can be stored, then the unknown user becomes a known user and the speaker embedding and/or visual embedding can be stored locally at the client device 410 in association with the known user. If the client device receives input indicating the speaker embedding and/or the visual embedding cannot be stored, then the unknown user remains an unknown user and the speaker embedding and/or visual embedding can be discarded.

For example, and as shown in FIG. 5D, assume the client device 410 determines a textual segment 452D1 of "Hey Tim, I want you to meet my friend Stan" corresponding to additional user spoken input from Tim's friend Jim detected at the client device 410, and renders the textual segment 452D1 via the user interface 480. The client device 410 can generate a speaker embedding based on the additional user spoken input from Jim, and can determine the additional user spoken input corresponding to the textual segment 452D1 originated from Jim based on identifying a matching speaker embedding stored locally on the client device 410 as described herein (e.g., with respect to FIGS. 2B, 4B, and 4C). Further assume the client device 410 determines a textual segment 454D1 of "Nice to meet you, Tim" corresponding to additional user spoken input from Jim's friend Stan detected at the client device 410, and renders the textual segment 454D1 via the user interface 480. The client device 410 can generate a speaker embedding based on the additional user spoken input from Stan, and can determine the additional user spoken input corresponding to the textual segment 452D2 originated from an unknown user based on identifying there is no matching speaker embedding stored locally on the client device 410 as described herein (e.g., with respect to FIGS. 2B, 4B, and 4C). Although FIG. 4D is described herein with respect to identifying additional participants in the conversation using speaker embeddings, it should be understood that the additional participants can also be identified based on visual embeddings (e.g., when an image of the additional participants is captured responsive to user interface input directed to graphical element 495 as described herein). Moreover, in some implementations, if the client device 410 receives authorization to store a corresponding speaker embedding for the unknown user, the client device 410 can also render a prompt soliciting an image of the unknown user, such that a visual embedding for the unknown user can also be established in addition to the speaker embedding for the unknown user.

Further, based on determining the additional user spoken input corresponding to the textual segment 452D2 originated from an unknown user, the automated assistant can generate a prompt 456D1 of "Hi Stan, can I store your speaker embedding locally on this device to recognize you in the future?", and can render the prompt 456D1 audibly and/or visually by the client device 410 or by an additional client device of the unknown user (e.g., the additional client device 310B of FIG. 3). Further assume the client device 410 determines a textual segment 454D2 of "Yes" corresponding to further additional user spoken input from Stan detected at the client device 410, and renders the textual segment 454D2 via the user interface 480. Accordingly, based on the client device 410 receiving authorization from Stan, as indicated by the textual segment 454D2, the client device 410 can store the speaker embedding for Stan locally at the client device in association with Stan (e.g., speaker embedding(s) database 112A of FIG. 1), and Stan can become a known user to the client device 410. Further, the speaker embedding for Stan can be utilized by the client device 410 to identify any additional user spoken input that originates from Stan in the future.

Further, the client device 410 can detect user interface input of "Very nice to meet you, Stan" from Tim. Assuming the user interface input is spoken input, the client device 410 can process the user interface input, using or more speech recognition model(s) (e.g., speech recognition model(s) 120A of FIG. 1) to determine a textual segment 458D1A of "Very nice to meet you, Stan!" corresponding to the spoken input from Tim. Moreover, the client device 410 can determine a third set of prosodic properties 458D1B based on at least the additional participants being both Jim (e.g., Tim's friend) and Stan (e.g., Jim's friend). Accordingly, the client device 410 can generate and audibly render (e.g., as indicated by sound waves 476 and using speaker(s) of the client device 410 and/or of an additional computing device (e.g., computing device 310A of FIG. 3)) synthesized speech, that includes the textual segment 458D1A and that is synthesized with the third set of prosodic properties 458D1B, in response to receiving the user interface input at the client device 410. Further, user interface input directed to the textual segment 458D1A may cause the synthesized speech to be audibly rendered again without the need for Tim to provide any additional spoken input.

Moreover, in some implementations when there are multiple additional participants in the conversation, the client device 410 may utilize the more "formal" set of prosodic properties, from among different sets of prosodic properties for each of the multiple additional participants, in generating synthesized speech. For example, even though the conversation depicted in FIG. 4D includes Tim's friend Jim, the third set of prosodic properties 458D1B are more "formal" than the second set of prosodic properties 454C1B utilized when Tim is having a conversation with only Tim (e.g., as indicated by comparing indicator 444 of FIGS. 4C and 4D). In this example, even though Stan is Jim's friend, Tim and Stan have only just met, and the client device 410 can utilize a more "formal" set of default prosodic properties (e.g., the third set of prosodic properties 458D1B) for unknown users and/or users recently known to the client device 410. In some other implementations when there are multiple additional participants in the conversation, the client device 410 may average sets of prosodic properties, from among different sets of prosodic properties for each of the multiple additional participants, in generating synthesized speech. For example, assume that the second set of prosodic properties 454C1B are associated with Jim, and assume that the first set of prosodic properties 454B1B are associated with Stan as a default set of prosodic properties for unknown users and/or users recently known to the client device 410. In this example, the indicator 444 of FIG. 4D indicates that the third set of prosodic properties 458D1B is an average of the first set of prosodic properties 454B1B (e.g., as shown by indicator 444 of FIG. 4B) and the second set of prosodic properties 454C1B (e.g., as shown by indicator 444 of FIG. 4C).

Further, in some implementations, the prosodic properties associated with a given additional participant in a conversation can be adjusted over time. For example, assume that Tim engages in further conversations with Stan either in-person or via telephone calls, text messaging, SMS messaging, email, and/or other forms of communication. As Tim engages in these further conversations with Stan, the prosodic properties associated with Stan can become be adjusted to be more casual and/or informal to reflect changes in their relationship over time. In this manner, the set of prosodic properties used in generating the synthesized speech can be adjusted throughout a given conversation based on each of the multiple additional participants in the given conversation, and can also be adjusted based on how a relationship evolves over time.

Figure 4E:
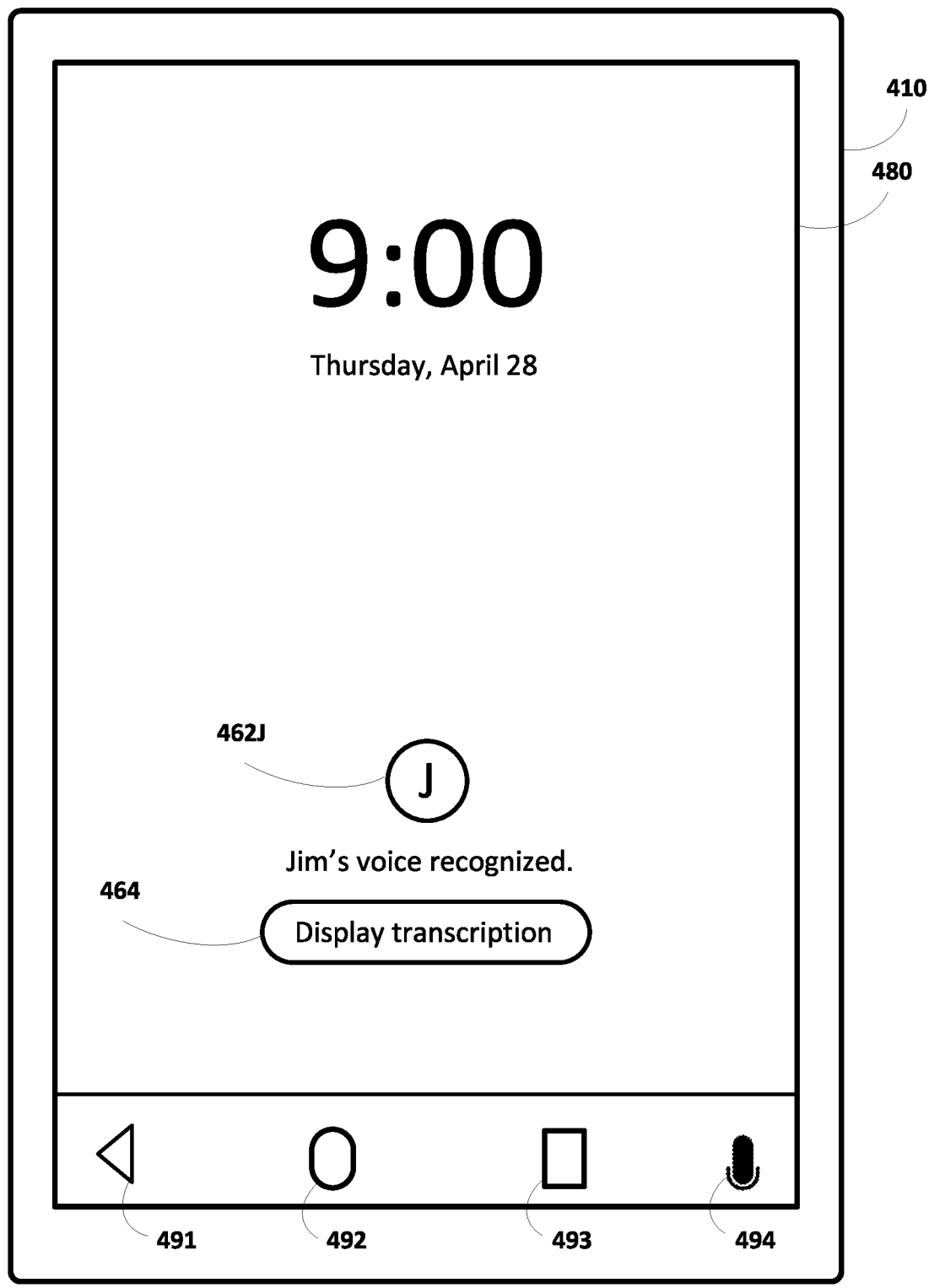
Figure 4F:
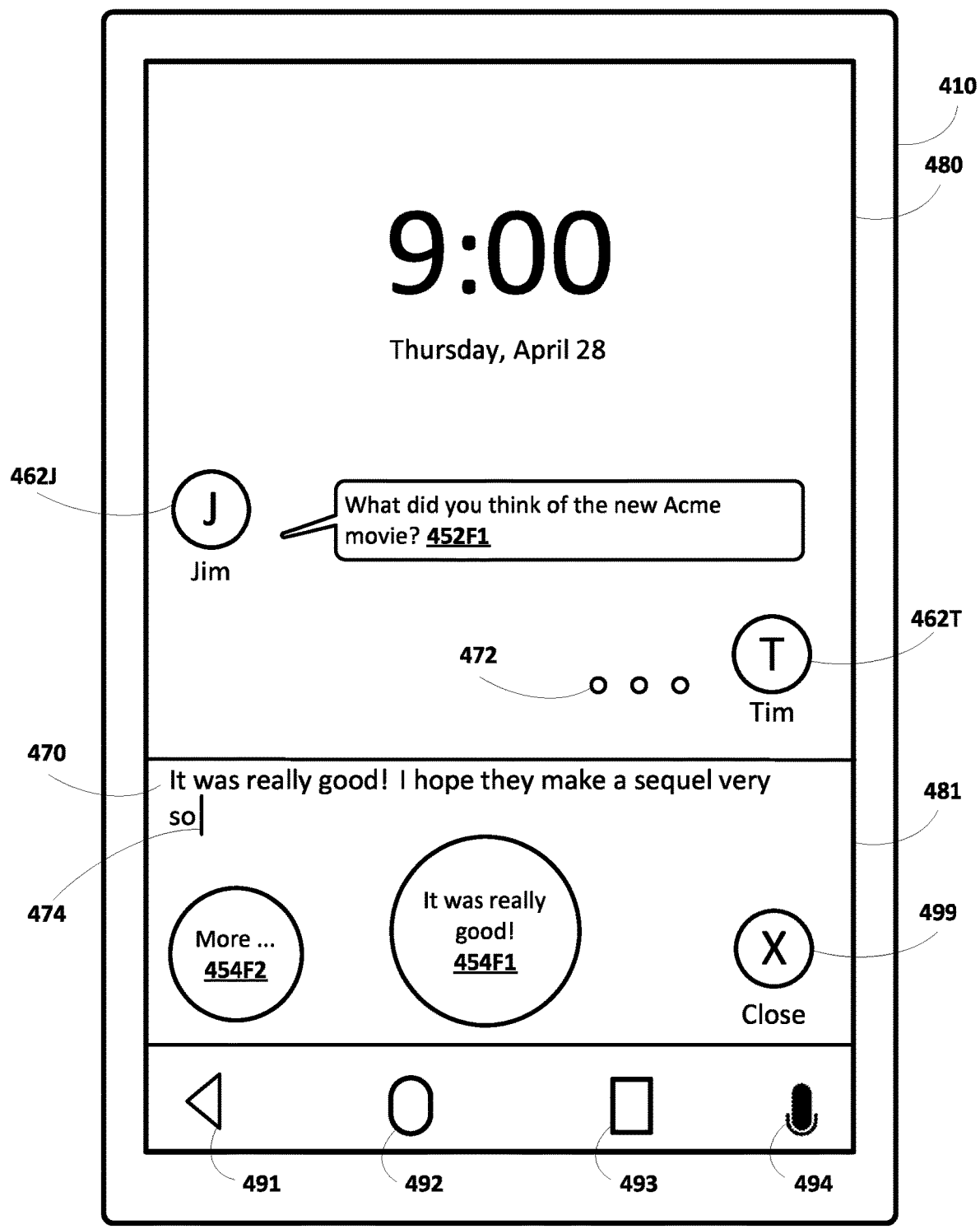

Turning now to FIGS. 4E and 4F, a locked screen is depicted on the user interface 480 of the client device 410 (e.g., as indicated by the time and date information on the user interface 480 of the client device 410). In some implementations, the client device 410 can still detect additional user spoken input when the client device 410 is locked. In some versions of those implementations, an indication of the additional user can be rendered on the lock screen, such as graphical element 462J in FIG. 4E, if the additional user is a known user, such as Tim's friend Jim. Moreover, graphical element 464 can be rendered on the user interface 480 of the client device 410. The client device 410 can, when the graphical element 464 is selected, cause a transcription of the additional user spoken input to be displayed on the locked screen of the client device 410 (e.g., as depicted in FIG. 4F), or cause the client device 410 to be unlocked and the transcription displayed via the user interface 480 (e.g., as depicted in FIGS. 4A-4D).

For example, assume the client device 410 detects user interface input directed to the graphical element 464, determines a textual segment 452F1 of "What did you think of the new Acme movie?" corresponding to the additional user spoken input from Jim detected at the client device 410, and renders the textual segment 452F1 via the user interface 480. As depicted in FIG. 4F, the client device 410 determines a transcription 470 corresponding to spoken input from Tim that is responsive to the additional user spoken input from Jim, and renders the transcription via the textual segment user interface 481. Notably, the transcription 470 of the further spoken input is incomplete (e.g., as indicated by ellipses 472 and cursor 474), and Tim may be edit any portion of the transcription 470 by providing touch input and/or spoken input directed to the textual segment user interface 481 prior to any indication that the further spoken input is complete (e.g., end-pointing and/or other techniques for detecting completion of spoken input). Moreover, first suggestion 454F1 that includes a candidate textual segment can be visually rendered along with the transcription 470. The client device 410 can generate the first suggestion 454F1 using an automatic suggestion engine as described in more detail herein (e.g., with respect to automatic suggestion engine 150 of FIG. 1). Further, suggestion 454F2 can also be visually rendered along with the transcription 470 and the first suggestion 454F2, and, when selected, can cause additional suggestions to be visually rendered via the textual segment user interface 481. Upon receiving further user interface input at the client device 410 directed to the first suggestion 454F1, the client device 410 can include the candidate textual segment the first suggestion 454F2 (e.g., "It was really good!") into the transcription 470, or the client device 410 can generate synthesized speech, using Tim's speech embedding established in FIG. 4A, that includes the candidate textual segment (e.g., in lieu of the textual segment included in the transcription 470), and that is synthesized with a set of prosodic properties as described herein. In implementations where the client device 410 renders the textual segment 452F1 and the transcription 470 on the user interface 480 while the client device is locked, user interface input can, when directed to graphical element 499, return the client device 410 back to the locked screen depicted in FIG. 4E.

Figure 5:
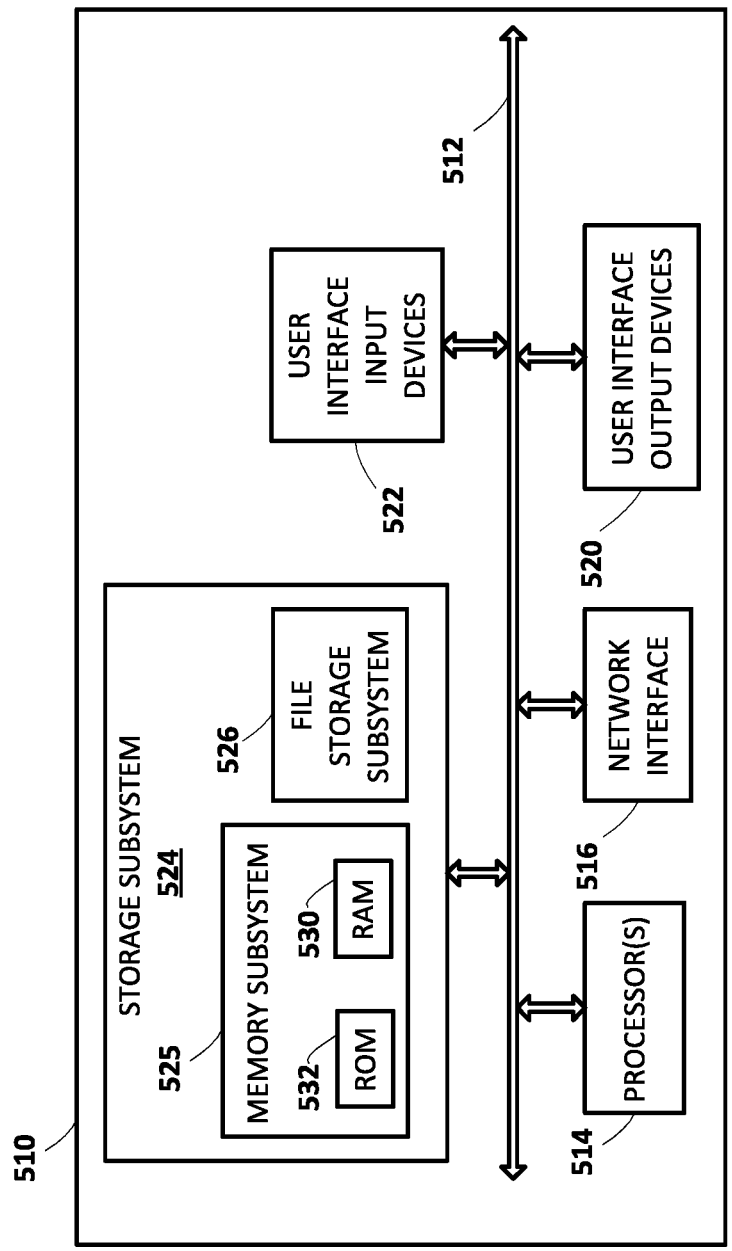
FIG. 5 depicts an example architecture of a computing device, in accordance with various implementations.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes, determining, based on at least one user interface input at a client device of a given user, a textual segment for conveying in a conversation in which the given user is a participant, identifying an additional participant in the conversation, the additional participant being in addition to the given user, determining one or more prosodic properties based on at least one attribute of a relationship between the given user and the additional participant, and generating synthesized speech audio data that includes synthesized speech that incorporates the textual segment and that is synthesized with the one or more prosodic properties. Generating the synthesized speech audio data includes synthesizing the synthesized speech with the one or more prosodic properties responsive to determining the prosodic properties based on the attribute of the relationship between the given user and the additional participant. The method further includes causing the synthesized speech to be rendered via one or more speakers of the client device and/or an additional client device. The rendered synthesized speech is audibly perceptible to the additional participant.

These and other implementations of technology disclosed herein can optionally include one or more of the following features.

In some implementations, the at least one user interface input can include a spoken input, of the given user, that is detected via one or more microphones of the client device, and determining, based on the at least one user interface input at the client device, the textual segment can include processing the spoken input using a speech recognition model to generate the textual segment. In some versions of those implementations, the speech recognition model can be an on-device speech recognition model and/or is trained for recognizing speech of speech impaired users.

In some implementations, the at least one user interface input can include selection of a graphical element that conveys the textual segment, and the graphical element that conveys the textual segment can be displayed at a display of the client device along with at least one alternative selectable graphical element that conveys an alternative textual segment. In some versions of those implementations, the method can further include, prior to the user interface inputs at the client device detecting, via one or more microphones of the client device, an additional participant spoken input, of the additional participant, processing the additional participant spoken input using a speech recognition model to generate an additional participant textual segment that is a recognition of the additional participant spoken input, determining that the textual segment is a candidate response to the additional participant textual segment, and determining to display the graphical element that conveys the textual segment responsive to determining that the textual segment is the candidate response to the additional participant textual segment.

In some further versions of those implementations, identifying the additional participant in the conversation can further include performing speaker identification using the additional participant spoken input, and identifying the additional participant based on the speaker identification. In yet further versions of those implementations, performing the speaker identification can include generating, at the client device, a spoken input embedding based on processing the additional participant spoken input using a speaker identification model, and comparing, at the client device, the spoken input embedding to a pre-stored embedding for the additional participant, the pre-stored embedding being previously stored locally at the client device responsive to authorization by the additional participant.

In some further versions of those implementations, determining that the textual segment is the candidate response to the additional participant textual segment can be further based on at least one of the attributes of the relationship between the given user and the additional participant. In yet further versions of those implementations, determining that the textual segment is the candidate response to the additional participant textual segment is further based on the at least one of the attributes of the relationship between the given user and the additional participant can include generating a superset of initial candidate responses based on the additional participant textual segment, the superset including the textual segment, and selecting, from the superset of initial candidate responses, the textual segment as the candidate response based on the at least one of the attributes of the relationship between the given user and the additional participant.

In some further versions of those implementations, the method can further include determining at least one classification of a location of the client device. Determining that the textual segment is the candidate response to the additional participant textual segment can be further based on the at least one classification of the location.

In some implementations, the method can further include identifying a further additional participant in the conversation, the further additional participant being in addition to the given user and being in addition to the additional participant, and determining the one or more prosodic properties based on both: (a) the attributes of the relationship between the given user and the additional participant, and (b) one or more additional attributes of an additional relationship between the given user and the further additional participant.

In some implementations, the method can further include identifying a further additional participant in the conversation, the further additional participant being in addition to the given user and being in addition to the additional participant, determining the one or more prosodic properties based on the attributes of the relationship between the given user and the additional participant, in lieu of one or more additional attributes of an additional relationship between the given user and the further additional participant, responsive to: determining that the relationship between the given user and the additional participant is more formal than the additional relationship between the given user and the further additional participant.

In some implementations, identifying the additional participant in the conversation can further include identifying the additional participant based on one or more images captured by a camera of the client device. In some versions of those implementations, the camera can include an adjustable viewport, and the one or more images can be captured subsequent to adjustment, of the adjustable viewport, responsive to other user interface input at the client device of the given user. In some versions of those implementations, identifying the additional participant based on the images captured by the camera of the client device can include rendering an image, of the one or more images, on a display of the client device, the image capturing multiple humans, including the additional participant, receiving other user interface input at the client device of the given user that designates an area, of the image, that captures the additional participant and excludes all other of the multiple humans, and identifying the additional participant based on processing of the area of the image.

In some implementations, the method can further include determining at least one classification of a location of the client device. Determining the prosodic properties can be further based on the classification of the location of the client device.

In some implementations, the one or more prosodic properties can include one or more of intonation, tone, stress, and rhythm.

In some implementations, a method implemented by one or more processors is provided and includes, processing additional user spoken input, detected via one or more microphones of a client device of a given user, to determine that there is voice activity, in an environment of the client device, that is not from the given user, the additional user spoken input being of an additional user that is in the environment with the client device and the given user. The method further includes responsive to determining that there is voice activity that is not from the given user, causing a graphical indication of the voice activity to be rendered at a display of the client device, and receiving a selection of the graphical indication. The method further includes, responsive to receiving the selection: processing given user spoken input, using a speech recognition model, to generate given user recognized text, the given user spoken input detected via the one or more microphones of the client device, and the given user spoken input being of the given user and being provided subsequent to the additional user spoken input, generating synthesized speech audio data that includes synthesized speech that incorporates the given user recognized text, and causing the synthesized speech to be rendered via one or more speakers of the client device and/or an additional client device. The rendered synthesized speech is audibly perceptible to the additional user.

These and other implementations of technology disclosed herein can optionally include one or more of the following features.

In some implementations, processing the additional user spoken input to determine that there is voice activity that is not from the given user can include performing speaker identification using the additional user spoken input, and determining that there is voice activity that is not from the given user based on the speaker identification. In some versions of those implementations, determining that there is voice activity that is not from the given user based on the speaker identification can include generating, at the client device, a spoken input embedding based on processing the additional user spoken input, and determining that the spoken input embedding does not match a pre-stored embedding for the given user.

In some versions of those implementations, determining that there is voice activity that is not from the given user based on the speaker identification can include generating, at the client device, a spoken input embedding based on processing the additional user spoken input, and determining that the spoken input embedding matches a pre-stored embedding for the additional user, the pre-stored embedding for the additional user being previously stored locally at the client device responsive to authorization by the additional user. In some further versions of those implementations, the graphical indication of the voice activity can include a semantic identifier of the additional user, the semantic identifier being previously associated with the pre-stored embedding.

In some implementations, the method can further include automatically selecting one or more synthesized speech properties. Generating synthesized speech audio data can include synthesizing the synthesized speech with the automatically selected one or more synthesized speech properties. In some versions of those implementations, automatically selecting the one or more synthesized speech properties can include determining at least one classification of a location of the client device, and automatically selecting the one or more synthesized speech properties based on the classification of the location of the client device. In some versions of those implementations, automatically selecting the one or more synthesized speech properties can include determining whether further users are in the environment with the client device and the given user, and automatically selecting the one or more synthesized speech properties based on whether further users, that are in addition to the given user and that are in addition to the additional user, are in the environment with the client device and the given user. In some versions of those implementations, automatically selecting the one or more synthesized speech properties can include identifying the additional user, and automatically selecting the one or more synthesized speech properties based on one or more attributes of a relationship between the given user and the additional user.

In some implementations, the one or more synthesized speech properties comprise prosodic properties.

In some implementations, a method implemented by one or more processors is provided and includes, receiving, at a client device of a given user, user input that indicates a desire of the given user to converse with an additional user, in an environment with the given user and the client device. The method further includes, subsequent to receiving the user input: processing additional user spoken input, using a speech recognition model, to generate additional user recognized text, the additional user spoken input detected via one or more microphones of the client device, determining that a textual segment is a candidate response to the additional user recognized text, based on receiving the user input, and based on determining that the textual segment is the candidate response, displaying a graphical element that conveys the textual segment, and receiving a selection of the graphical element. The method further includes, responsive to receiving the selection: generating synthesized speech audio data that includes synthesized speech that incorporates the textual segment, and causing the synthesized speech to be rendered via one or more speakers of the client device and/or an additional client device. The rendered synthesized speech is audibly perceptible to the additional user.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   detecting, via one or more microphones of a client device of a given user, spoken input of the given user;
   determining, based on processing the spoken input of the given user, a textual segment for conveying in a conversation in which the given user is a participant;
   identifying an additional participant in the conversation, the additional participant being in addition to the given user, and the additional participant being physically located in an environment with the given user;
   determining at least one attribute of a relationship between the given user and the additional participant;
   determining, based on the at least one attribute of the relationship between the given user and the additional participant, a given set of one or more prosodic properties, wherein the given set of the one or more prosodic properties is a first set of the one or more prosodic properties in response to determining the at least one attribute of the relationship between the given user and the additional participant is a first attribute, and wherein the given set of the one or more prosodic properties is a second set of the one or more prosodic properties in response to determining the at least one attribute of the relationship between the given user and the additional participant is a second attribute;
   generating synthesized speech audio data that includes synthesized speech that incorporates the textual segment and that is synthesized with the given set of the one or more prosodic properties, wherein generating the synthesized speech audio data comprises synthesizing the synthesized speech with the given set of the one or more prosodic properties responsive to determining the given set of the one or more prosodic properties based on the attribute of the relationship between the given user and the additional participant; and
   causing the synthesized speech to be rendered via one or more speakers of the client device and/or an additional client device, wherein the rendered synthesized speech is audibly perceptible to the additional participant.

2. The method of claim 1, wherein determining, based on processing the spoken input of the given user, the textual segment, comprises:
   processing the spoken input using a speech recognition model to generate the textual segment.

3. The method of claim 2, wherein the speech recognition model is an on-device speech recognition model and/or is trained for recognizing speech of speech impaired users.

4. The method of claim 1, further comprising, subsequent to causing the synthesized speech to be rendered:
   detecting, via one or more of the microphones of the client device, an additional participant spoken input, of the additional participant;
   processing the additional participant spoken input using a speech recognition model to generate an additional participant textual segment that is a recognition of the additional participant spoken input;
   determining that an additional textual segment is a candidate response to the additional participant textual segment; and
   determining to display a graphical element that conveys the additional textual segment responsive to determining that the additional textual segment is the candidate response to the additional participant textual segment.

5. The method of claim 4, wherein identifying the additional participant in the conversation comprises:
   performing speaker identification using the additional participant spoken input; and
   identifying the additional participant based on the speaker identification.

6. The method of claim 5, wherein performing the speaker identification comprises:
   generating, at the client device, a spoken input embedding based on processing the additional participant spoken input using a speaker identification model; and
   comparing, at the client device, the spoken input embedding to a pre-stored embedding for the additional participant, the pre-stored embedding being previously stored locally at the client device responsive to authorization by the additional participant.

7. The method of claim 4, wherein determining that the additional textual segment is the candidate response to the additional participant textual segment is further based on the at least one attribute of the relationship between the given user and the additional participant.

8. The method of claim 7, wherein determining that the additional textual segment is the candidate response to the additional participant textual segment is further based on the at least one attribute of the relationship between the given user and the additional participant comprises:
   generating a superset of initial candidate responses based on the additional participant textual segment, the superset including the additional textual segment; and
   selecting, from the superset of initial candidate responses, the additional textual segment as the candidate response based on the at least one of the attributes of the relationship between the given user and the additional participant.

9. The method of claim 4, further comprising:
   determining at least one classification of a location of the client device;
   wherein determining that the additional textual segment is the candidate response to the additional participant textual segment is further based on the at least one classification of the location.

10. The method of claim 4, further comprising:
    in response to receiving a user selection, from the given user, of the graphical element that conveys the additional textual segment:
    generating additional synthesized speech audio data that includes additional synthesized speech that incorporates the additional textual segment and that is synthesized with the one or more prosodic properties, wherein generating the additional synthesized speech audio data comprises synthesizing the additional synthesized speech with the one or more prosodic properties; and causing the additional synthesized speech to be rendered via one or more of the speakers of the client device and/or the additional client device, wherein the rendered additional synthesized speech is audibly perceptible to the additional participant.

11. The method of claim 1, further comprising:
identifying a further additional participant in the conversation, the further additional participant being in addition to the given user and being in addition to the additional participant;
determining the given set of the one or more prosodic properties based on both:
(a) the attribute of the relationship between the given user and the additional participant, and
(b) one or more additional attributes of an additional relationship between the given user and the further additional participant.

12. The method of claim 1, further comprising:
identifying a further additional participant in the conversation, the further additional participant being in addition to the given user and being in addition to the additional participant;
determining the given set of the one or more prosodic properties based on the attribute of the relationship between the given user and the additional participant, in lieu of one or more additional attributes of an additional relationship between the given user and the further additional participant, responsive to:
determining that the relationship between the given user and the additional participant is more formal than the additional relationship between the given user and the further additional participant.

13. The method of claim 1, further comprising:
determining at least one classification of a location of the client device;
wherein determining the prosodic properties is further based on the classification of the location of the client device.

14. The method of claim 1, wherein the one or more prosodic properties comprise one or more of intonation, tone, stress, and rhythm.

15. The method of claim 1, wherein identifying the additional participant in the conversation comprises:
identifying the additional participant based on one or more images captured by a camera of the client device.

16. The method of claim 15, wherein the camera comprises an adjustable viewport, and wherein the one or more images are captured subsequent to adjustment, of the adjustable viewport, responsive to other user interface input at the client device of the given user.

17. The method of claim 15, wherein identifying the additional participant based on the images captured by the camera of the client device comprises:
rendering an image, of the one or more images, on a display of the client device, wherein the image captures multiple humans, including the additional participant;
receiving other user interface input at the client device of the given user that designates an area, of the image, that captures the additional participant and excludes all other of the multiple humans; and
identifying the additional participant based on processing of the area of the image.

18. A system comprising:
one or more processors; and
memory storing instructions that, when executed, cause the one or more processors to perform operations, the operations comprising:

detecting, via one or more microphones of a client device of a given user, spoken input of the given user;
determining, based on processing the spoken input of the given user, a textual segment for conveying in a conversation in which the given user is a participant;
identifying an additional participant in the conversation, the additional participant being in addition to the given user, and the additional participant being physically located in an environment with the given user;
determining at least one attribute of a relationship between the given user and the additional participant;
determining, based on the at least one attribute of the relationship between the given user and the additional participant, a given set of one or more prosodic properties, wherein the given set of the one or more prosodic properties is a first set of the one or more prosodic properties in response to determining the at least one attribute of the relationship between the given user and the additional participant is a first attribute, and wherein the given set of the one or more prosodic properties is a second set of the one or more prosodic properties in response to determining the at least one attribute of the relationship between the given user and the additional participant is a second attribute;
generating synthesized speech audio data that includes synthesized speech that incorporates the textual segment and that is synthesized with the given set of the one or more prosodic properties, wherein generating the synthesized speech audio data comprises synthesizing the synthesized speech with the given set of the one or more prosodic properties responsive to determining the given set of the one or more prosodic properties based on the attribute of the relationship between the given user and the additional participant; and
causing the synthesized speech to be rendered via one or more speakers of the client device and/or an additional client device, wherein the rendered synthesized speech is audibly perceptible to the additional participant.

19. A non-transitory computer-readable storage medium storing instructions that, when executed, cause one or more processors to perform operations, the operations comprising:
detecting, via one or more microphones of a client device of a given user, spoken input of the given user;
determining, based on processing the spoken input of the given user, a textual segment for conveying in a conversation in which the given user is a participant;
identifying an additional participant in the conversation, the additional participant being in addition to the given user, and the additional participant being physically located in an environment with the given user;
determining at least one attribute of a relationship between the given user and the additional participant;
determining, based on the at least one attribute of the relationship between the given user and the additional participant, a given set of one or more prosodic properties, wherein the given set of the one or more prosodic properties is a first set of the one or more prosodic properties in response to determining the at least one attribute of the relationship between the given user and the additional participant is a first attribute, and wherein the given set of the one or more prosodic properties is a second set of the one or more prosodic properties in response to determining the at least one attribute of the relationship between the given user and the additional participant is a second attribute;

generating synthesized speech audio data that includes synthesized speech that incorporates the textual segment and that is synthesized with the given set of the one or more prosodic properties, wherein generating the synthesized speech audio data comprises synthesizing the synthesized speech with the given set of the one or more prosodic properties responsive to determining the given set of the one or more prosodic properties based on the attribute of the relationship between the given user and the additional participant; and causing the synthesized speech to be rendered via one or more speakers of the client device and/or an additional client device, wherein the rendered synthesized speech is audibly perceptible to the additional participant.

* * * * *